(12) United States Patent
Morioka et al.

(10) Patent No.: US 7,945,410 B2
(45) Date of Patent: May 17, 2011

(54) SEMICONDUCTOR DEVICE YIELD PREDICTION SYSTEM AND METHOD

(75) Inventors: Natsuyo Morioka, Tokyo (JP); Seiji Ishikawa, Kawasaki (JP); Katsumi Ikegaya, Akishima (JP); Yasunori Yamaguchi, Fussa (JP); Kazuo Ito, Oume (JP); Yuichi Hamamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 463 days.

(21) Appl. No.: 11/836,199

(22) Filed: Aug. 9, 2007

(65) Prior Publication Data
US 2008/0140330 A1    Jun. 12, 2008

(30) Foreign Application Priority Data

Aug. 10, 2006  (JP) .................................. 2006-218570
Jul. 3, 2007  (JP) .................................. 2007-175578

(51) Int. Cl.
G01N 37/00   (2006.01)
G06F 19/00   (2006.01)

(52) U.S. Cl. .............................. 702/81; 702/84; 700/109
(58) Field of Classification Search ...................... 702/81
See application file for complete search history.

(56) References Cited

U.S. PATENT DOCUMENTS

| | | | |
|---|---|---|---|
| 6,338,001 B1 * | 1/2002 | Steffan et al. | 700/121 |
| 6,542,830 B1 * | 4/2003 | Mizuno et al. | 702/35 |
| 2002/0143483 A1 * | 10/2002 | Ono et al. | 702/83 |
| 2005/0055121 A1 * | 3/2005 | Wang | 700/110 |
| 2005/0071788 A1 * | 3/2005 | Bickford et al. | 716/4 |
| 2005/0288812 A1 * | 12/2005 | Cheng et al. | 700/109 |

FOREIGN PATENT DOCUMENTS

| | | |
|---|---|---|
| JP | 11-176892 | 7/1999 |
| JP | 2001-230289 | 8/2001 |
| JP | 2002-076086 | 3/2002 |
| JP | 2002-100548 | 4/2002 |
| JP | 2003-017541 | 1/2003 |
| JP | 2003-022946 | 1/2003 |
| JP | 2003-023056 | 1/2003 |

(Continued)

OTHER PUBLICATIONS

James A. Cunningham, "The Use and Evaluation of Yield Models in Integrated Circuit Manufacturing", IEEE Transactions on Semiconductor Manufacturing, vol. 3, No. 2, 1990.

(Continued)

*Primary Examiner* — Jonathan C. Teixeira Moffat
(74) *Attorney, Agent, or Firm* — Antonelli, Terry, Stout & Kraus, LLP.

(57) ABSTRACT

An average fault ratio is calculated from product characteristics of a product as a target of yield prediction, in order to predict yield accurately in the course of manufacturing the prediction target product.

With respect to a reference product, whose wiring pattern is different from the prediction target product but manufactured by the same manufacturing process, a monthly electric fault density is calculated from actually measured data. Respective average fault ratios are obtained from product characteristics of the prediction target product and the reference product. A monthly electric fault density of the prediction target product is obtained by multiplying the monthly electric fault density of the reference product by the ratio of the average fault ratios. The yield is calculated by using the monthly electric fault density of the month in which a yield prediction target lot of the prediction target product was processed.

5 Claims, 26 Drawing Sheets

FOREIGN PATENT DOCUMENTS

| | | |
|---|---|---|
| JP | 2004-031891 | 1/2004 |
| JP | 2006-222118 | 8/2006 |

OTHER PUBLICATIONS

Sandrine Barberan-Frédéric Duvivier, Defect and Fault Tolerance in VLSI Systems, 1998 Proceedings, 1998 IEEE International Symposium on "Management of Critical Areas and Defectivity Data for Yield Trend Modeling", pp. 17-25.

Matsumoto, et al., "Development of Enterprise-wide Yield Management System using Critical Area Analysis for Multi-Product Semiconductor Manufacturing", pp. 91-96, Nov. 9, 2005.

* cited by examiner

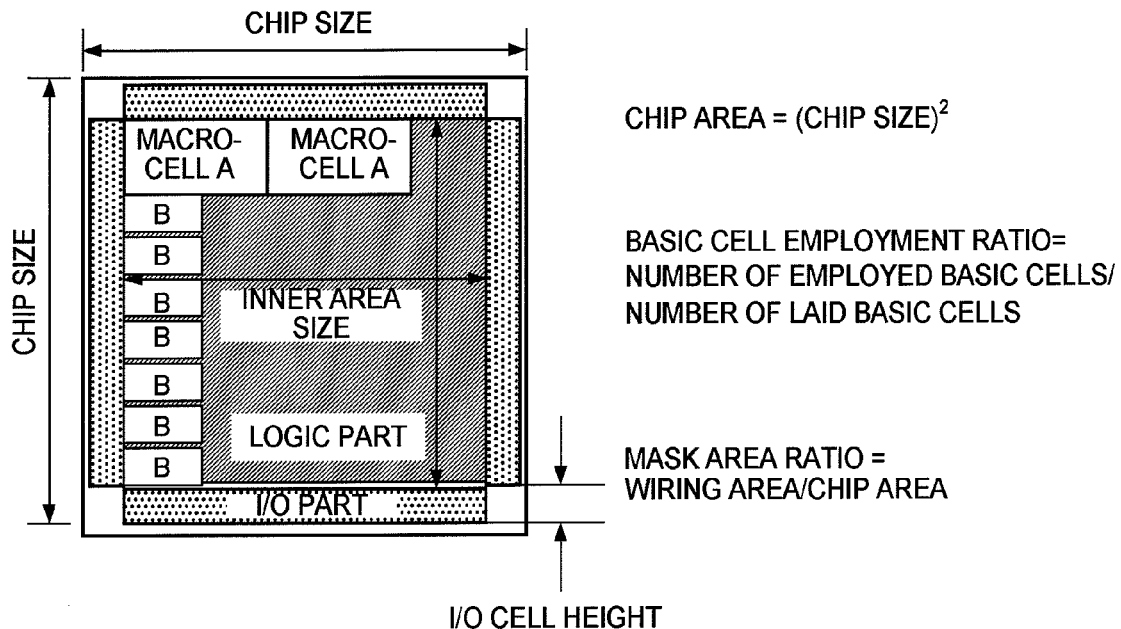

FIG. 6

STEP 12', 17'

START OF FUNCTIONAL BLOCK AVERAGE
FAULT RATIO STORING PROCESSING

↓

601

SIZES OF FUNCTIONAL BLOCKS AS COMPONENTS OF PRODUCT GROUP
AND PRODUCT B AND AVERAGE FAULT RATIO OF EACH CIRCUIT
PATTERN ARE ACQUIRED FROM FUNCTIONAL BLOCK AVERAGE FAULT
RATIO MANAGEMENT TABLE, AND STORED INTO STORAGE.

↓

END OF FUNCTIONAL BLOCK AVERAGE
FAULT RATIO STORING PROCESSING

| FUNCTIONAL BLOCK | SIZE (mm²) | AVERAGE FAULT RATIO | | | | |
|---|---|---|---|---|---|---|
| | | $\theta L$ | $\theta FG$ | $\theta M1$ | $\theta M2$ | $\theta M3$ |
| MACRO-CELL A | 10 | 0.226 | 0.259 | 0.297 | 0.292 | 0.287 |
| MACRO-CELL B | 2 | 0.253 | 0.301 | 0.334 | 0.292 | 0.352 |
| MACRO-CELL C | 1.5 | 0.231 | 0.255 | 0.321 | 0.293 | 0.28 |
| MACRO-CELL D | 0.5 | 0.121 | 0.091 | 0.187 | 0.178 | 0.135 |
| I/O | — | 0.091 | 0.157 | 0.172 | 0.111 | 0.087 |

| LAYOUT LAYER | AVERAGE FAULT RATIO PREDICTION MODEL |
|---|---|
| L | θL=(Σ(θLi * Ai)+θLIO * AIO +FUNCTION L(BC EMPLOYMENT RATIO) * Alogic)/A |
| FG | θFG=(Σ(θFGi * Ai)+θFGIO * AIO +FUNCTION FG(BC EMPLOYMENT RATIO) * Alogic)/A |
| M1 | θM1=(Σ(θM1i * Ai)+θM1IO * AIO +FUNCTION M1(BC EMPLOYMENT RATIO) * Alogic)/A |
| M2 | θM2=(Σ(θM2i * Ai)+θM2IO * AIO +FUNCTION M2(BC EMPLOYMENT RATIO) * Alogic)/A |
| M3 | θM3=(Σ(θM3i * Ai)+θM3IO * AIO +FUNCTION M3(BC EMPLOYMENT RATIO) * Alogic)/A |
| M4 | θM4=C41 * RATIO M4+ C42 |
| M5 | θM5=C51 * RATIO M5+ C52 |
| M6 | θM6=C61 * RATIO M6+ C62 |
| M7 | θM7=C71 * RATIO M7+ C72 |
| M8 | θM8=C81 * RATIO M8+ C82 |

FIG. 22

| LAYER NAME (2031) | YIELD IMPACT (2032) |
|---|---|
| LAYER a | 0.27 |
| LAYER b | 0.42 |
| LAYER c | 0.56 |
| LAYER d | 0.45 |
| LAYER e | 0.22 |
| LAYER f | 0.33 |

STEP 12

START OF MONTHLY AVERAGE DEFECT COUNT CALCULATION PROCESSING

AMONG DEFECT COORDINATE DATA STORED IN OPTICAL INSPECTION APPARATUS WITH RESPECT TO LAYER c OF PRODUCT GROUP MANUFACTURED BY PROCESS SIMILAR TO PROCESS OF PRODUCT A, DATA REGISTERED IN THE PREVIOUS MONTH IS RETRIEVED AND STORED INTO MEMORY THROUGH LOCAL AREA NETWORK AND DATA INPUT PART. — 92

WITH RESPECT TO DEFECT COORDINATE DATA IN MEMORY, NUMBER OF DEFECTS AND ITS STANDARD DEVIATION $\sigma$ ARE CALCULATED. THEN, MONTHLY AVERAGE NUMBER OF DEFECTS IS CALCULATED USING ONLY WAFERS WHOSE NUMBER OF DEFECTS IS AVERAGE $\pm 2\sigma$, AND RESULT IS STORED INTO MEMORY. — 93

END OF MONTHLY AVERAGE DEFECT COUNT CALCULATION PROCESSING

FIG. 24

STEP 13

( START OF MONTHLY ELECTRIC FAULT DENSITY CALCULATION PROCESSING )

↓

FOLLOWING FORMULA IS CALCULATED USING LAYER c YIELD IMPACT $KR_C$ STORED IN YIELD IMPACT TABLE OF PRODUCT A, LAYER c MONTHLY AVERAGE NUMBER OF DEFECTS IN MEMORY, CHIP AREA $S_A$ OF PRODUCT A, THE NUMBER N OF CHIPS ON WAFER OF PRODUCT A. RESULT IS STORED INTO MONTHLY ELECTRIC FAULT DENSITY TABLE OF PRODUCT A.
(MONTHLY ELECTRIC FAULT DENSITY $D_{AC}$ OF LAYER c OF PRODUCT A)
= (YIELD IMPACT $KR_C$ OF LAYER c) x (MONTHLY AVERAGE NUMBER OF DEFECTS OF LAYER c)/(CHIP AREA $S_A$ THE NUMBER OF CHIPS) —102

↓

( END OF MONTHLY FATAL DEFECTELECTRIC FAULT DENSITY CALCULATION PROCESSING )

| LAYER NAME | JANUARY | FEBRUARY | MARCH | APRIL | MAY | JUNE |
|---|---|---|---|---|---|---|
| LAYER a | 0.082 | 0.018 | 0.012 | 0.016 | 0.021 | 0.033 |
| LAYER b | 0.024 | 0.025 | 0.025 | 0.021 | 0.019 | 0.020 |
| LAYER c | 0.065 | 0.049 | 0.042 | 0.031 | 0.028 | 0.032 |
| LAYER d | 0.036 | 0.016 | 0.025 | 0.018 | 0.036 | 0.017 |
| LAYER e | 0.009 | 0.011 | 0.014 | 0.013 | 0.011 | 0.009 |
| LAYER f | 0.009 | 0.011 | 0.014 | 0.013 | 0.011 | 0.009 |

STEPS 14, 15

START OF PRODUCT CHARACTERISTIC ACQUISITION PROCESSING

↓

PRODUCT CHARACTERISTICS (CHIP SIZE, SRAM OCCUPANCY AND LOGIC PART AREA RATIO) OF PRODUCT A AND PRODUCT CHARACTERISTICS OF PRODUCT B ARE ACQUIRED FROM PRODUCT CHARACTERISTIC TABLE AND STORED INTO STORAGE. —121

↓

END OF PRODUCT CHARACTERISTIC ACQUISITION PROCESSING

FIG. 27

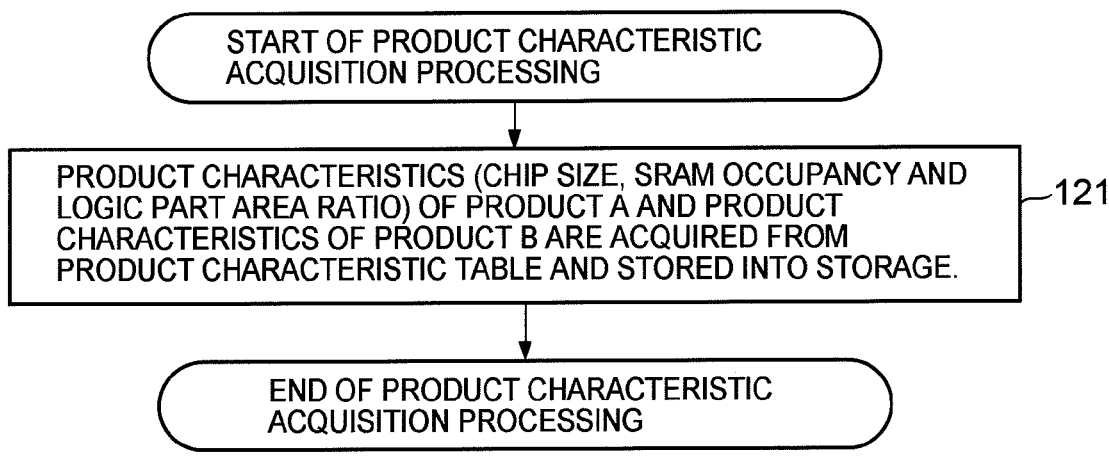

CHIP AREA = (CHIP SIZE)$^2$

SRAM OCCUPANCY = (SRAM PART AREA)/(CHIP AREA)

LOGIC PART AREA RATIO = (LOGIC PART AREA)/(CHIP AREA)

| VARIETY NAME | CHIP SIZE (cm) | SRAM OCCUPANCY (%) | LOGIC PART AREA RATIO (%) |
|---|---|---|---|
| PRODUCT A | 1.5 | 36 | 35 |
| PRODUCT B | 1.6 | 7 | 60 |

| LAYER NAME | CIRCUIT PATTERN | AVERAGE FAULT RATIO PREDICTION MODEL |
|---|---|---|
| LAYER a | L | $\theta 1*S = \theta 1_{SRAM} * S_{SRAM} + \theta 1_{LOGIC} * S_{LOGIC}$ |
| LAYER b | L | $\theta 2*S = \theta 2_{SRAM} * S_{SRAM} + \theta 2_{LOGIC} * S_{LOGIC}$ |
| LAYER c | FG | $\theta 3*S = \theta 3_{SRAM} * S_{SRAM} + \theta 3_{LOGIC} * S_{LOGIC}$ |
| LAYER d | M1 | $\theta 4*S = \theta 4_{SRAM} * S_{SRAM} + \theta 4_{LOGIC} * S_{LOGIC}$ |
| LAYER e | M2 | $\theta 5*S = C1*S_{SRAM} + C2*S_{LOGIC} + C3$ |
| LAYER f | M3 | $\theta 6*S = C4*S_{WIRING} + C5$ |

(2021, 2022, 2023, 202)

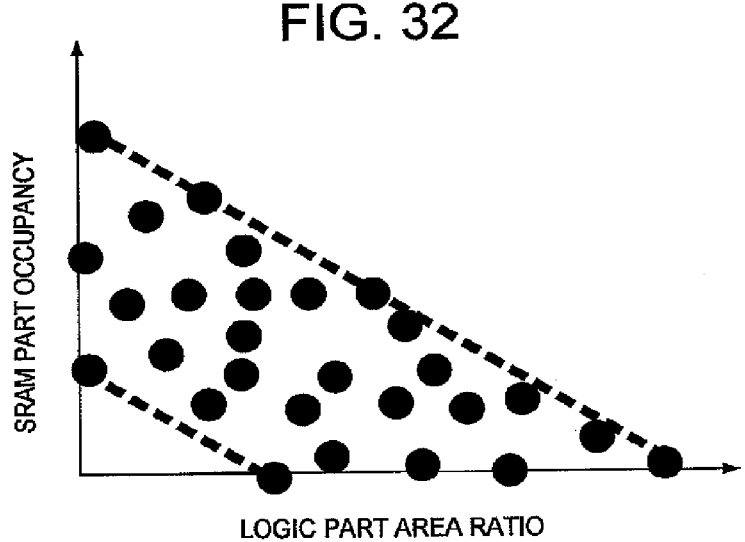

FIG. 32

SRAM PART OCCUPANCY vs LOGIC PART AREA RATIO

FIG. 33
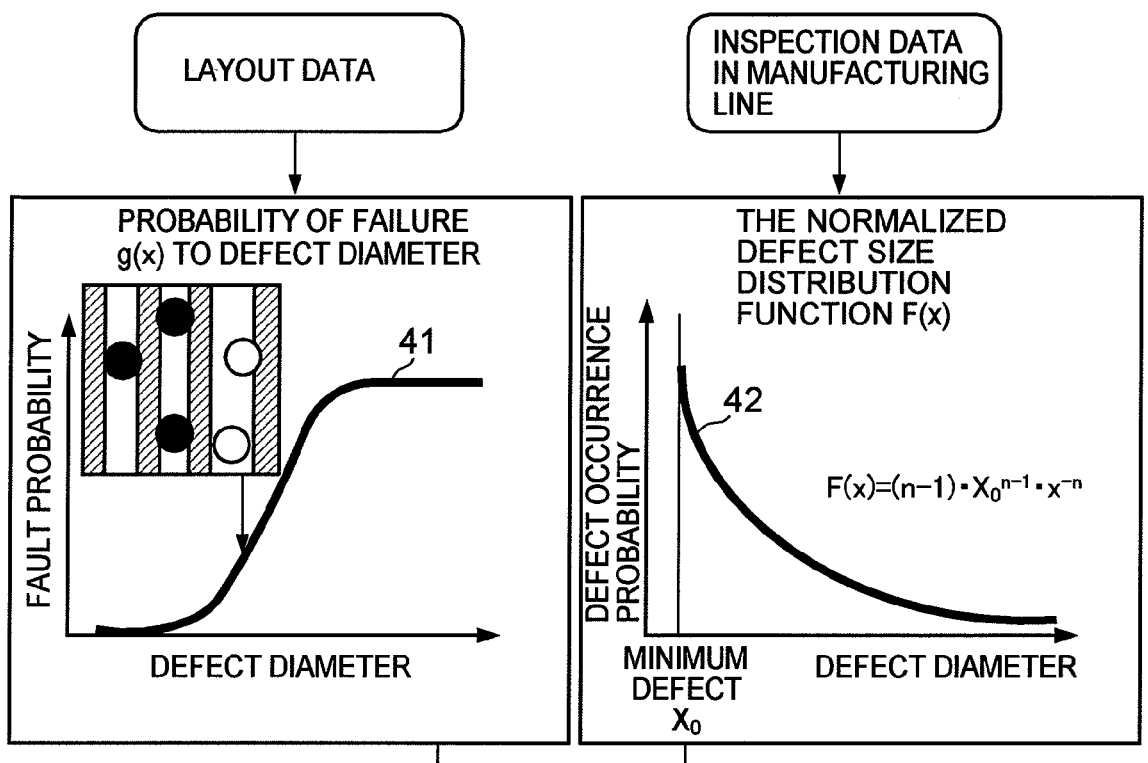
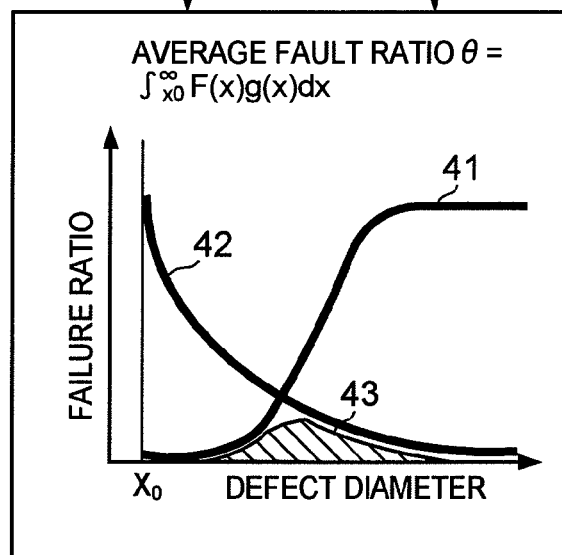

| LAYER NAME | JANUARY | FEBRUARY | MARCH | APRIL | MAY | JUNE |
|---|---|---|---|---|---|---|
| LAYER a | 0.091 | 0.020 | 0.013 | 0.018 | 0.023 | 0.036 |
| LAYER b | 0.026 | 0.028 | 0.028 | 0.023 | 0.022 | 0.022 |
| LAYER c | 0.072 | 0.054 | 0.047 | 0.034 | 0.031 | 0.035 |
| LAYER d | 0.034 | 0.015 | 0.023 | 0.017 | 0.034 | 0.016 |
| LAYER e | 0.008 | 0.011 | 0.013 | 0.012 | 0.010 | 0.008 |
| LAYER f | 0.009 | 0.011 | 0.014 | 0.013 | 0.011 | 0.009 |

FIG. 38

| LAYER NAME | JANUARY | FEBRUARY | MARCH | APRIL | MAY | JUNE | JULY |
|---|---|---|---|---|---|---|---|
| LAYER a | 0.091 | 0.020 | 0.013 | 0.018 | 0.023 | 0.036 | |
| LAYER b | 0.026 | 0.028 | 0.028 | 0.023 | 0.022 | 0.022 | |
| LAYER c | 0.072 | 0.054 | 0.047 | 0.034 | 0.031 | 0.035 | |
| LAYER d | 0.034 | 0.015 | 0.023 | 0.017 | 0.034 | 0.016 | |
| LAYER e | 0.008 | 0.011 | 0.013 | 0.012 | 0.010 | 0.008 | |
| LAYER f | 0.009 | 0.011 | 0.014 | 0.013 | 0.011 | 0.009 | 0.009 |

FIG. 39

| LAYER NAME | JANUARY | FEBRUARY | MARCH | APRIL | MAY | JUNE | JULY |
|---|---|---|---|---|---|---|---|
| LAYER a | 0.091 | 0.020 | 0.013 | 0.018 | 0.023 | 0.036 | |
| LAYER b | 0.026 | 0.028 | 0.028 | 0.023 | 0.022 | 0.022 | |
| LAYER c | 0.072 | 0.054 | 0.047 | 0.034 | 0.031 | 0.035 | |
| LAYER d | 0.034 | 0.015 | 0.023 | 0.017 | 0.034 | 0.016 | |
| LAYER e | 0.008 | 0.011 | 0.013 | 0.012 | 0.010 | 0.008 | |
| LAYER f | 0.009 | 0.011 | 0.014 | 0.013 | 0.011 | 0.009 | 0.009 |

SEMICONDUCTOR DEVICE YIELD PREDICTION SYSTEM AND METHOD

This application relates to and claims priority from Japanese Patent Application No. 2006-218570, filed on Aug. 10, 2006 and No. 2007-175578, filed on Jul. 3, 2007.

BACKGROUND OF THE INVENTION

The present invention relates to a technique of predicting yields of an electronic device such as a semiconductor integrated circuit at the time when an order for the product is received and at the time when the product is manufactured, and particularly to a technique of predicting yields of a semi-custom IC from which kinds of electronic devices can be produced by connecting circuit elements (macro-cells) depending on requests of customers.

Generally, a manufacturing process of an electronic device represented by a semiconductor integrated circuit can be broadly divided into a pre-process in which a plurality of chips are produced by stacking layers, such as circuit pattern layers, on a silicon wafer, and a post-process in which the silicon wafer is cut into individual chips to complete a product. Most defects generated in the course of manufacturing are generated in the pre-process. Accordingly, improvement in yield in the pre-process holds the key to electronic device business. Here, the yield in the pre-process means a rate of good chips determined by electrical inspection (probing test) as the final test in the pre-process. In other words, the yield in the pre-process means a ratio of the number of good chips to the number of all chips on a wafer.

Manufacturing of an electronic device whose circuit elements (macro-cells) are connected depending on requests of customers is small-volume production with large variety. Accordingly, to be sure of making a profit, it is necessary to predict yield of a product precisely and to decide a price properly at the time of receiving an order. In the case where it is found after the launch of a product that the yield is lower than the predicted value, then delivery to the customer is delayed since no substitute product exists. On the other hand, in the case where the yield is higher than the predicted value and surplus articles are produced, then those articles go to waste since there is a limited number of customers requiring the product. Thus, precise prediction of yield at the time of receiving an order of a product and at the time of manufacturing the product is essential to making a profit.

Failures as a cause of deterioration of yield of a pre-process can be broadly classified into functional failure and characteristic failure. A functional failure is a failure as a result of which a circuit does not operate normally, and arises mainly from breaking or shorting of a circuit pattern, which is caused in turn by a dust particle or a pattern defect occurring in the course of manufacturing. On the other hand, a characteristic failure is a defect as a result of which performance such as operating speed of a transistor or a capacitance of a condenser does not satisfy design specifications, and arises from slight variations in processing: for example, a variation in circuit dimension or oxide film thickness. Hereinafter in the present description, both dust particles and pattern defects, which become causes of functional failures, are referred to as a defect or defects.

As a simulation method for finding degree of functional failures caused by a defect, the Critical Area Analysis is a representative one. This is a method in which degree of occurrence of functional failures is calculated using a designed circuit pattern and a relation between the total number of defects generated and diameter of the defects. For example, PDF Solutions, Inc., USA, Defect and Yield Management (DYM), Inc., USA, and HPL, Inc., USA commercialize simulation software using the Critical Area Analysis.

Further, a yield prediction method using the Critical Area Analysis obtains an average fault ratio (probability that a defect creates a fault) by using a curve of POF (probability of failure) against defect diameter, which is made by inputting circuit pattern design layout data, and a curve of the normalized defect size distribution function, which is made by inputting results of inspection of the manufacturing line. The obtained average fault ratio is used to predict the yield (See Patent Document 1, for example).

Here, with respect to a relation between defect related yield Yr and defects, various yield models have been proposed and evaluated (See Non-patent Document 1, for example). According to the Poisson yield model, which assumes that defects occur uniformly at random positions in a wafer surface and their occurrence follows the Poisson distribution, the yield Yrb of a layer b is expressed by the following equation $$Yrb = \exp(-Do_b * \theta_b * S) \quad \text{(Eq. 1)}$$

In this equation, $Do_b$ is the total number of defects, which occur in a circuit layer b stacked in the pre-process) per unit area (total defect density), $\theta_b$ is an average fault ratio of the circuit layer b, and S is a chip area. It is difficult to know accurately the total defect density $Do_b$ of the defects occurring in the circuit layer b. Thus, in practice, the performance-based total defect density Dob' is calculated using the actual yield Yrb' of the circuit layer b, the average fault ratio θb and the chip area S. The calculated $Do_b$' is used to obtain a electric fault density ($Do_b$'×θb) of the circuit layer b, and then the electric fault density is multiplied by the chip area S to calculate the defect related yield Yrb of the circuit layer b. Also, for each circuit layer (n) other than the circuit layer b, yield Yrn is calculated similarly. The yield of chips of the pre-process can be obtained by multiplying the yields of all the circuit layers (See Patent Document 1, for example).

On the other hand, the method by which the average fault ratio θ of chips is calculated by obtaining the sum of the respective average fault ratios of the circuit layers, and D0 is calculated from the actual yield Y and the chip area S according to the following equation Eq. 2 is disclosed (Patent Document 2, for example).

$$\ln(Y) = -D0 * \theta * S + \ln(Ys) \quad \text{(Eq. 2)}$$

Here, Ys is yield resulting from characteristic failures. In a yield maturity period in which slight variation in circuit dimension, oxide film thickness and the like, as causes of characteristic failures, is suppressed, the second term ln(Ys) of Eq. 2 becomes 0. As a result, when ln(Y) calculated from the yield of the yield maturity period and θ*S are plotted for various kinds of products, then a curve with gradient (−D0) is obtained. Here, D0 is an average value of the total number of defects that occur in a line. Using D0, an average electric fault density of a product whose yield is to be predicted is calculated, and a goal of the defect related yield can be calculated.

There is a method in which all the critical areas (each of which is obtained by multiplying an average fault ratio θ of the functional block in question by an occupied area S of that functional block) of functional blocks (such as an SRAM unit and a Logic unit) that can be arranged on a chip are obtained in advance, and an average fault ratio of the chip is calculated by dividing the sum of the respective critical areas of the functional blocks by the sum of the occupied areas (See Patent Document 3, for example).

Patent Document 1: Japanese Un-examined Patent Application Laid-Open No. 2002-76086
Patent Document 2: Japanese Un-examined Patent Application Laid-Open No. 2006-222118
Patent Document 3: Japanese Un-examined Patent Application Laid-Open No. 2004-31891
Non-patent Document 1: James A. Cunningham, "The Use and Evaluation of Yield Models in Integrated Circuit Manufacturing", IEEE Transactions on Semiconductor Manufacturing, Volume 3, Number 2, 1990

A gate array product is a semi-custom IC from which kinds of electronic devices can be produced by connecting circuit elements (macro-cells) depending on requests of customers. In a gate array product, logic gates are formed in a transistor formation layer and necessary gates only are connected through a wiring layer. By preparing in advance a wafer called a master that has been processed up to making a transistor formation layer, there is a merit in that a product satisfying a request of a customer can be manufactured and delivered in a short time. However, design layout data of the transistor formation layer have logic gates that are not ultimately connected. Accordingly, a result of calculation of an average fault ratio, using such design layout data as in the above-mentioned Critical Area Analysis, leads to a larger value than the average fault ratio of an actual product.

Further, a gate array product is characterized by factors such as a chip size, which determines an extent of the number of mountable logic gates, a logic part area ratio, i.e., a ratio of connected logic gates to chip area, SRAM occupancy, i.e., a ratio of mounted SRAM parts to chip area. There are many products in which these factors are different. Thus, it is difficult to calculate average fault ratios of all circuit layers in all kinds of gate array products.

When the method described in Patent Document 3 is applied to a gate array product, an average fault ratio is estimated by combining average critical areas of functional blocks mounted on a chip. Thus, it is not necessary to calculate an average fault ratio from design layout data. However, this method does not consider connection lines between the functional blocks, and it is difficult to forecast an average fault ratio considering effects of all the connection lines.

Further, also in the case of a cell-based IC in which previously prepared macro-cells are arranged and wired, random logic parts formed in the other areas than the arranged macro-cells are variously different depending on requests of customers. Thus, it is difficult to calculate respective average fault ratios of the random logic parts.

Further, the conventional method of predicting yield is a method using a total defect density Do calculated on the basis of an actual yield. The actual yield is measured with respect to products manufactured in the past. Accordingly, there is a time lag between the time when a wafer for which yield was measured flowed a production process of a circuit layer b and the time when a type of product whose yield is to be predicted flows in the production process of the circuit layer b. The total defect density Do has a decisive influence on the accuracy of yield prediction. Thus, although it is considered that the yield prediction of the conventional method is sufficiently accurate for pricing a product at the time of receiving an order for the product, the accuracy of the conventional prediction method is low for controlling input.

The present invention has been made considering the above conditions. An object of the present invention is to provide a technique that can accurately predict yield with respect to a semi-custom IC from which kinds of electronic devices are manufactured by connecting circuit elements (macro-cells) depending on requests of customers, for appropriate pricing at the time of receiving an order for a product and appropriate controlling of input in the course of manufacturing an electronic device.

SUMMARY OF THE INVENTION

According to the present invention, at the time of receiving an order for a semi-custom IC product from which various electronic devices are manufactured by connecting circuit elements (macro-cells) according to requests of customers, the yield is calculated from the sum of average fault ratios of a prescribed circuit layer, which are obtained from various feature quantities of the yield calculation target product, and a total defect density D0 of the manufacturing line.

In detail, the present invention provides an electronic device yield prediction system for predicting manufacturing yield of an electronic device, wherein: the electronic device yield prediction system comprises:

a defect density calculation unit, which calculates the total number of defects occurring in a manufacturing line; an average fault ratio calculation unit, which calculates an average fault ratio that indicates proportion of defects causing the electronic device to be failure, among defects occurring at the time of manufacturing; and a yield calculation unit, which calculates the manufacturing yield by using defect density of the manufacturing line, which has been calculated by the defect density calculation unit, the average fault ratio of the electronic device, which has been calculated by the average fault ratio calculation unit, and a chip area of the electronic device; and wherein the average fault ratio calculation unit uses an average fault ratio prediction model that calculates the average fault ratio by using product characteristics i.e. factors characterizing the electronic devices.

Further, according to the present invention, in the course of manufacturing a semi-custom IC product from which varieties of electronic devices are manufactured by connecting circuit elements (macro-cells) depending on requests of customers, the yield is calculated from the average fault ratio of a prescribed circuit layer, which has been obtained from product characteristics of the yield calculation target product, and a electric fault density of a product different from the yield prediction target product in wiring patterns, and an average fault ratio of a prescribed circuit layer, which has been obtained similarly from the product characteristics.

In detail, the present invention provides an electronic device yield prediction system for predicting a manufacturing yield of a first electronic device, wherein: the electronic device yield prediction system comprises: a electric fault density calculation unit, which calculates a electric fault density, i.e. a density of defects causing failure among defects occurring in manufacturing, by using actually-measured data, with respect to a second electronic device different from the first electronic device in wiring patterns and for a predetermined unit of time; an average fault ratio calculation unit, which calculates a first average fault ratio that indicates a ratio of defects causing the first electronic device to be failure and a second average fault ratio that indicates a ratio of defects causing the second device to be failure, among defects occurring in manufacturing; a electric fault density translation unit, which calculates a electric fault density of the first electronic device by multiplying the electric fault density of the second electronic device, which has been calculated by the electric fault density calculation unit, and a proportion of the first average fault ratio to the second average fault ratio together, with the first and second average fault ratio being calculated by the average fault ratio calculation unit; and a yield calculation unit, which selects, on a basis of a manufacturing history of a prediction target lot of a yield prediction target product, a electric fault density of a period in which the prediction target lot was processed, among electric fault densities calculated for the predetermined unit of time and recorded by the electric fault density calculation unit, and uses the selected electric fault density to calculate the manufacturing yield; and the average fault ratio calculation unit uses an average fault ratio prediction model that calculates an average fault ratio by using product characteristics, i.e., factors characterizing the first and second electronic devices.

According to the present invention, it is possible to predict the yield at the time of receiving an order for a semi-custom IC product, in manufacturing a wide variety of products in small quantities where varieties of electronic devices can be produced by connecting circuit elements (macro-cells) depending on requests of customers. As a result, it is possible to set prices appropriately. Further, since the yield can be predicted accurately in the course of manufacturing, it is possible to control input amounts appropriately.

BRIEF DESCRIPTION OF THE DRAWINGS

FIG. 4 is a view showing an example of a variety;

FIG. 5 is a diagram showing an example of configuration of a product characteristic management table;

FIG. 6 is a flowchart showing average fault ratio storing processing;

FIG. 7 is a diagram showing an example of configuration of a functional block average fault ratio management table;

FIG. 11 is a diagram showing an example of configuration of an average fault ratio prediction model database;

FIG. 22 is a diagram showing an example of a yield impact management table;

FIG. 23 is a flowchart showing monthly average defect count calculation processing;

FIG. 24 is a flowchart showing monthly electric fault density calculation processing;

FIG. 25 is a diagram showing an example of a monthly electric fault density management table;

FIG. 26 is a flowchart showing product characteristic acquisition processing;

FIG. 27 is a view showing an example of layout pattern of a gate array product;

FIG. 28 is a diagram showing an example of a product characteristic management table;

FIG. 31 is a diagram showing an example of an average fault ratio prediction model database;

FIG. 32 is a diagram showing an example of distribution of product characteristics of family products;

FIG. 33 is a diagram explaining a procedure for obtaining an average fault ratio by the Critical Area Analysis;

FIG. 38 is a diagram explaining a procedure for obtaining a electric fault density;

FIG. 39 is a diagram explaining a procedure for obtaining a electric fault density;

DETAILED DESCRIPTION

Example 1

Figure 1:
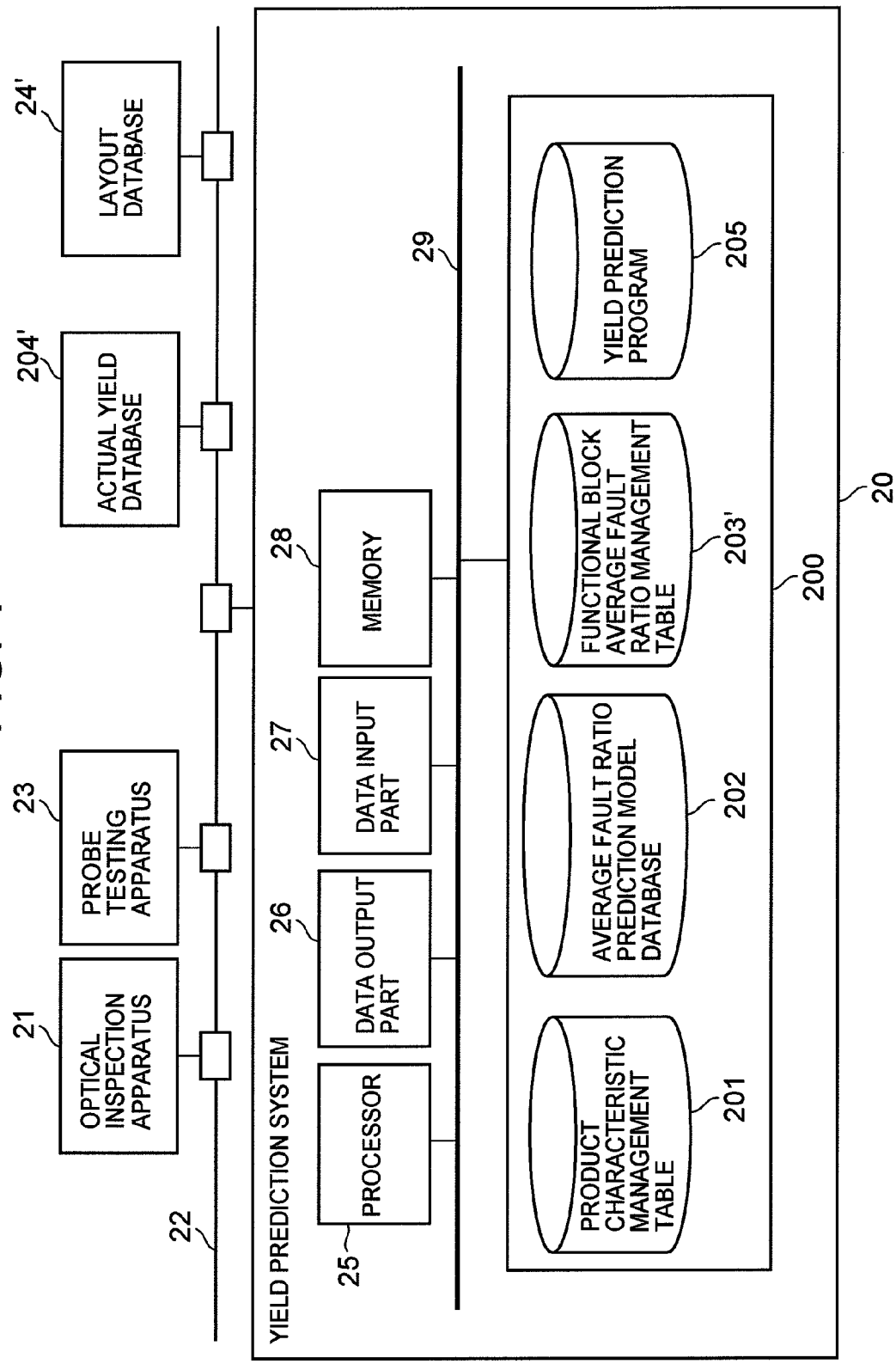
FIG. 1 is a block diagram showing a configuration of a yield prediction system according to one embodiment of the present invention.

A yield prediction system of one embodiment of the present invention will now be described referring to the drawings.

The yield prediction system of the present embodiment predicts a yield that results from functional failures with respect to an electronic device product B (a prediction target product) at the time when an order for the product is received.

A configuration of the yield prediction system of the present embodiment will be described. FIG. 1 is a block diagram showing a configuration of the yield prediction system of the present embodiment. As shown in the figure, the yield prediction system 20 of the present embodiment is connected to external units, namely, a optical inspection apparatus 21, an probe testing apparatus 23, an actual yield database 204' and a layout database 24' through a local area network 22.

The optical inspection apparatus 21 is an inline inspection apparatus that detects defects such as dust particles and pattern defects optically in the course of wafer manufacturing. The probe testing apparatus 23 is a so-called tester that tests electrically defects of an electric circuit of a chip on a wafer. The actual yield database 204' is a database that retains yield of a wafer (i.e. a ratio of the number of functional chips to the number of chips mounted on a wafer) tested by the probe testing apparatus 23. The layout database 24' is an apparatus that retains a layout of a product, and, in the present embodiment, stores layout data (layout patterns) of the product, B and a group of products produced in the past.

The yield prediction system 20 of the present embodiment comprises: a data input part 27 for receiving calculation conditions and the like from an operator; a data output part 26 for outputting data such as a calculation results to the outside; storage 200 for storing various programs and data for realizing yield prediction processing; a memory 28 as a temporary storage; a processor 25 for loading the programs stored in the storage 200 into the memory 28 to execute the programs; and a network 29 connecting these component units.

The storage 200 stores: a product characteristic management table 201 that manages product characteristics as factors characterizing a product; an average fault ratio prediction model database 202 for storing average fault ratio prediction models (mentioned below); a functional block average fault ratio management table 203' for storing an average fault ratio (mentioned below) of a functional block; and a yield prediction program 205 for realizing yield prediction processing.

When the processor 25 loads the yield prediction program 205 into the memory 28 and executes the program 205, then the program 205 realizes: a product characteristic acquisition part that acquires product characteristics of a group of products from the product characteristic management table 201; a functional block average fault ratio acquisition part that acquires average fault ratios of functional blocks mounted on a product from the functional block average fault ratio management table 203'; a critical area calculation processing part that calculates critical areas of the group of products by using the product characteristics of the group of products and the average fault ratio prediction model registered in the average fault ratio prediction model database 202; an actual yield acquisition part that acquires actual yields of the group of products from the actual yield database 204'; a defect density calculation processing part that calculates a defect density D0 of a manufacturing line from the actual yields and the critical areas; a electric fault count calculation part that calculates the number of electric faults of a yield prediction target product from the defect density and the critical area of the yield prediction target product; and a yield calculation part that calculates yield from the number of electric faults.

Next will be described an outline of a procedure in which the yield prediction system 20 of the present embodiment obtains a defect density of a manufacturing line on the basis of a relation between an actual yield and a critical area with respect to a group of products that have been already manufactured and then predicts a yield of the product B, i.e., the yield prediction target product, by using the critical area of the product B.

Figure 2:
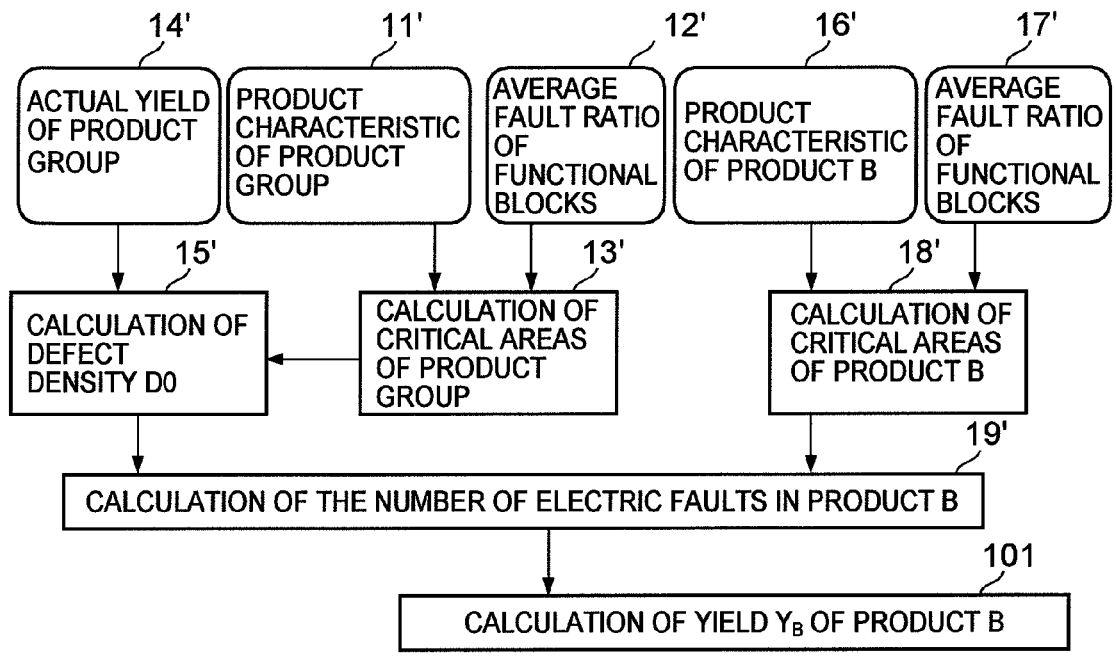
FIG. 2 is a diagram for explaining an outline of a yield prediction procedure.

An outline of a yield prediction procedure of the present embodiment, which is performed through various functions respectively, will be described. FIG. 2 is a diagram for explaining an outline of the yield prediction procedure performed by the processing parts of the yield prediction system 20 of the present embodiment.

First, the product characteristic acquisition part acquires product characteristics of products manufactured in the past from the product characteristic management table 201 (Step 11'). Product characteristics are quantities indicating a configuration of a variety of chip, and comprises: a chip size; an inner area size that is an area size excluding an I/O part positioned in the periphery of the chip; names and the number of macro-cells mounted in the inner area; a basic cell employment ratio, i.e., a ratio of basic cells used for logic circuits among basic cells that are laid over the inner area except for the areas of the macro-cells; an I/O cell height; and a mask area ratio, i.e., a ratio of a mask area in an upper wiring layer to the chip area.

Further, the functional block average fault ratio acquisition part acquires in transistor formation layers and lower wiring layers average fault ratios and sizes of functional blocks mounted in the group of products for which the product characteristics have been acquired, from the functional block average fault ratio management table 203 (Step 12').

Then, the critical area calculation processing part for calculating the critical areas of the group of products calculates critical areas for each layout layer by using the average fault ratio prediction models for the group of products, which are registered in the average fault ratio prediction model database 202 (Step 13'). Average fault ratio prediction models for a transistor formation layer and a lower wiring layer calculate critical areas of a chip, as the total sum of critical areas of functional blocks mounted on the chip, while an average fault ratio prediction model for an upper wiring layer is a regression model that predicts an average fault ratio on the basis of a mask area ratio.

Next, the actual yield acquisition part acquires actual yields of the group of products for which the critical areas have been calculated, from the actual yield database (Step 14'). Then, a gradient −D0 is acquired from a scatter diagram with axes of a logarithm of actual yield and a total sum of critical areas, to acquire an average defect density of a manufacturing line.

Next, the critical area of the product B as the prediction target product is calculated by the product characteristic acquisition part for the product B (Step 16'), the average fault ratio acquisition part for the functional blocks (Step 17'), and the critical area calculation part for the product B (Step 18'). The number of electric faults of the product B is calculated from the average defect density of the manufacturing line and the critical areas of the product B (Step 19'). Then, based on the number of electric faults, yield of the product B is calculated by using Poisson's yield prediction formula, for example (Step 101).

By the above steps, yield $Y_B$ of the product B can be predicted at the time of receiving an order for the product on the basis of the average defect occurrence density D0 of the manufacturing line and the product characteristics and the average fault ratios of the functional blocks of the product B.

Next, operation of the yield prediction system of the present embodiment will be described in detail for each of Steps 11'-101 shown in FIG. 2.

Figure 3:
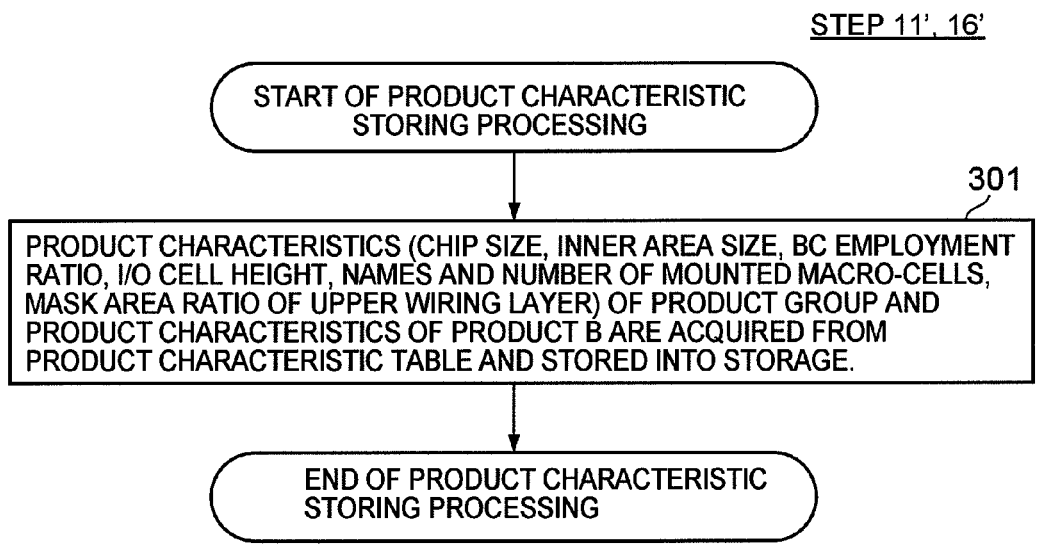
FIG. 3 is a flowchart showing product characteristic storing processing.

Product characteristic acquisition processing (Steps 11' and 16' of FIG. 2) performed by the product characteristic acquisition part will be described. FIG. 3 shows a flow of the product characteristic acquisition processing of the present embodiment. In the product characteristic acquisition processing, product characteristics of the group of products and product characteristics of the product B are acquired from the product characteristic management table 201 and stored into the memory (Step 301).

FIG. 4 is a conceptual diagram showing a configuration of a variety. Quantities that characterize a variety are chip size, an inner area size obtained by subtracting an I/O part from the chip size, kinds and numbers of macro-cells mounted in the inner area, a basic cell employment ratio (i.e., a ratio of the number of used basic cells for logic circuits to the number of laid basic cells over the area obtained by subtracting the macro-cell occupancy from the inner area), an I/O cell height, and a mask area ratio (i.e. a ratio of the wiring area to the chip area). FIG. 5 explains an example of the product characteristic management table 201. As product characteristics that characterize each product, the product characteristic management table 201 stores chip size (mm), an inner area size (mm), kinds and number of mounted macro-cells, a basic cell employment ratio (%), and an I/O cell height for each product. Further, since global wiring for connecting macro-cells increases in an upper wiring layer of a chip, it is not possible to estimate a critical area of a chip by considering only contributions of individual functional blocks. Thus, a mask area ratio is taken as a product characteristic for an upper wiring layer, instead of an average fault ratio and occupancy of functional blocks.

Functional block average fault ratio storing processing (Steps 12' and 17' in FIG. 2) will be described. FIG. 6 is a flow of the average fault ratio storing processing of the present embodiment. In the average fault ratio storing processing, an average fault ratio and each size for each layout layer of functional blocks as a component of a product is stored into the memory (Step 601).

Figure 8:
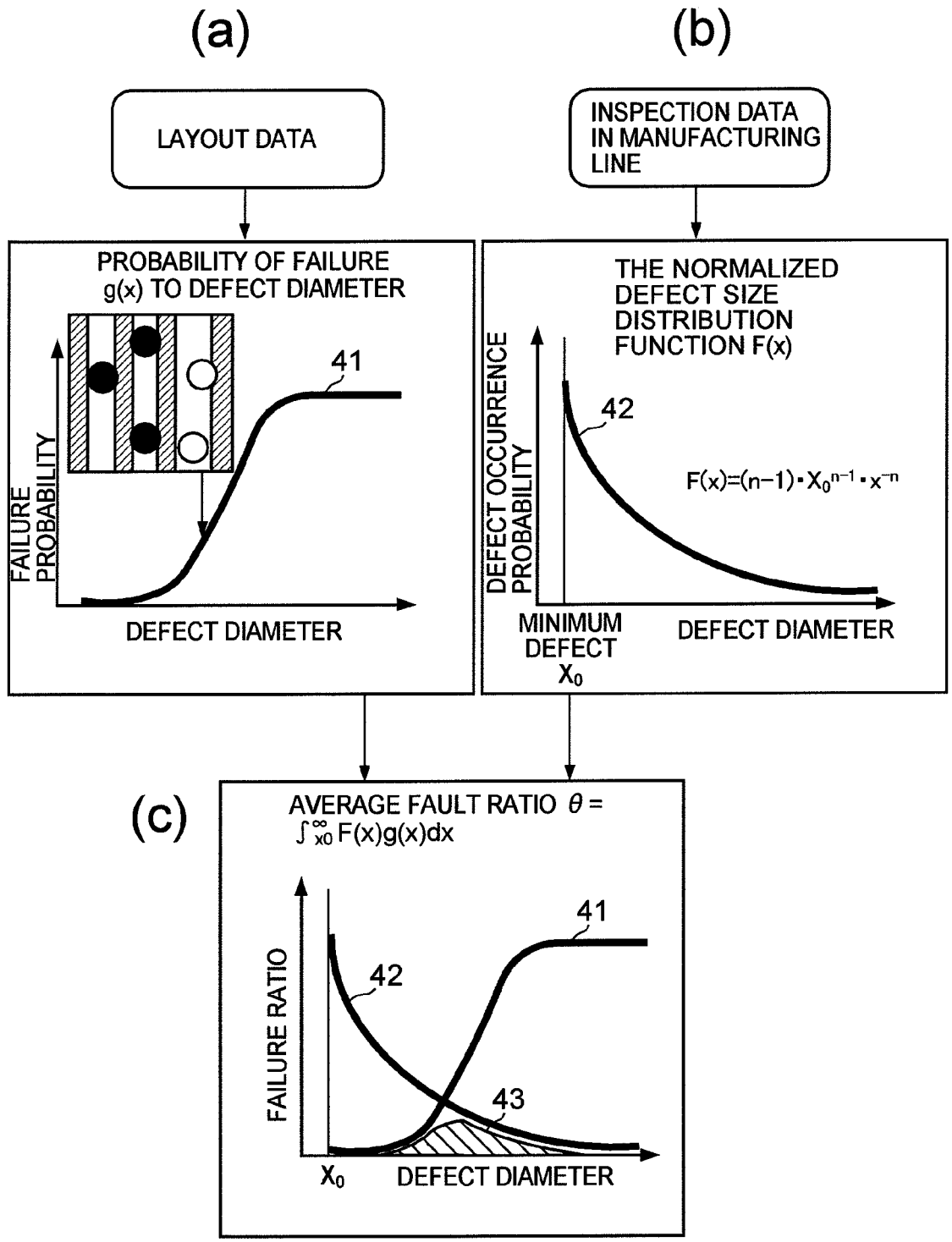
FIG. 8 is a diagram explaining a procedure for obtaining an average fault ratio by the Critical Area Analysis.

FIG. 7 shows an example of the functional block average fault ratio management table 203'. Functional blocks described in the functional block average fault ratio management table 203' are macro-cells and the I/O part mounted in the group of products and the product B. The size of a functional block is a value obtained from design data stored in the layout database. An average fault ratio of a functional block is obtained by performing the CAA simulation that uses the conventional Critical Area Analysis. The CAA simulation, i.e., the Critical Area Analysis is a well-known method, and its procedure is described only simply here. FIG. 8 is a diagram explaining a procedure for obtaining an average fault ratio by the Critical Area Analysis.

The Critical Area Analysis is a method that comprises a step in which circuit pattern layout data are inputted to generate a curve 41 of failure probability against defect diameter (FIG. 8(a)), a step in which inspection result data in a manufacturing line is inputted to generate a defect occurrence rate curve (the normalized defect size distribution curve) 42 or the normalized defect size distribution curve 42 is generated by using a formula (FIG. 8(b)). The Critical Area Analysis obtains a hatched part 43 from a product-sum of these two curves 41 and 42 (FIG. 8(c)) to obtain an average fault ratio θ.

The curve 41 in FIG. 8(a) shows that larger the diameter of a defect is, the higher the probability of failure (short circuit or breaking) in a circuit pattern. Further, it is known that defects occurring in a manufacturing line are expressed by $F(x)=(n-1)\cdot x_o^{n-1}\cdot x^{-n}$, where $F(x)$ is an occurrence rate, x is a diameter of a defect, and n is a defect size distribution parameter. The curve 42 in FIG. 8(b) is depicted according to this formula. The product of the curve 41 and the curve 42 is obtained, and then the integral of the product from the minimum diameter $x_0$ to infinity leads to the area of the hatched part 43 of FIG. 8(c). By this, it is possible to obtain an average fault ratio θL of an L layout layer of a macro-cell A of the product B, for example.

Figure 17:
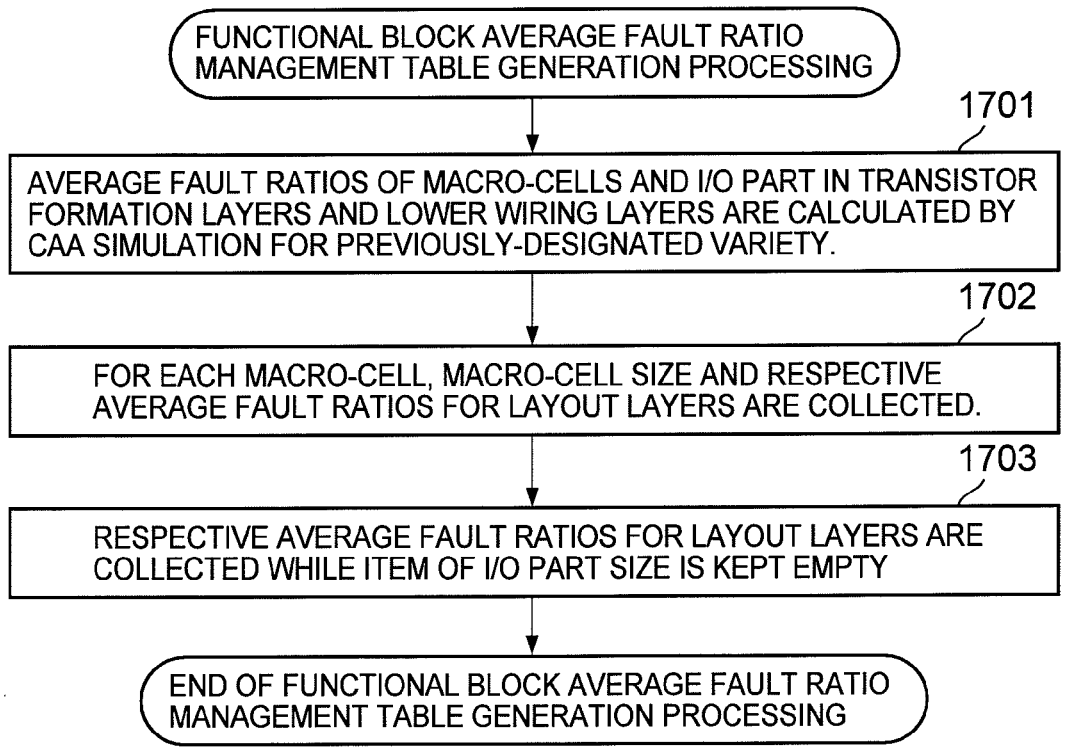
FIG. 17 is a flowchart showing functional block average fault ratio management table generation processing.

Here, functional block average fault ratio management table generation processing will be described referring to FIG. 17. First, in the functional block average fault ratio management table generation processing, average fault ratios of the macro-cells and the I/O part in each layout layer of the transistor formation layer and the lower wiring layer are calculated by the CAA simulation with respect to a variety designated in advance (Step 1701).

Next, for each macro-cell, the size of the macro-cell and respective average fault ratios for the layout layers are collected together (Step 1702). Since the area occupied by the I/O part is different depending on a chip size, with the size item of the I/O part not inputted, only the respective average fault ratios for the layout layers are stored in the functional block average fault ratio management table 203' (Step 1703).

Figure 9:
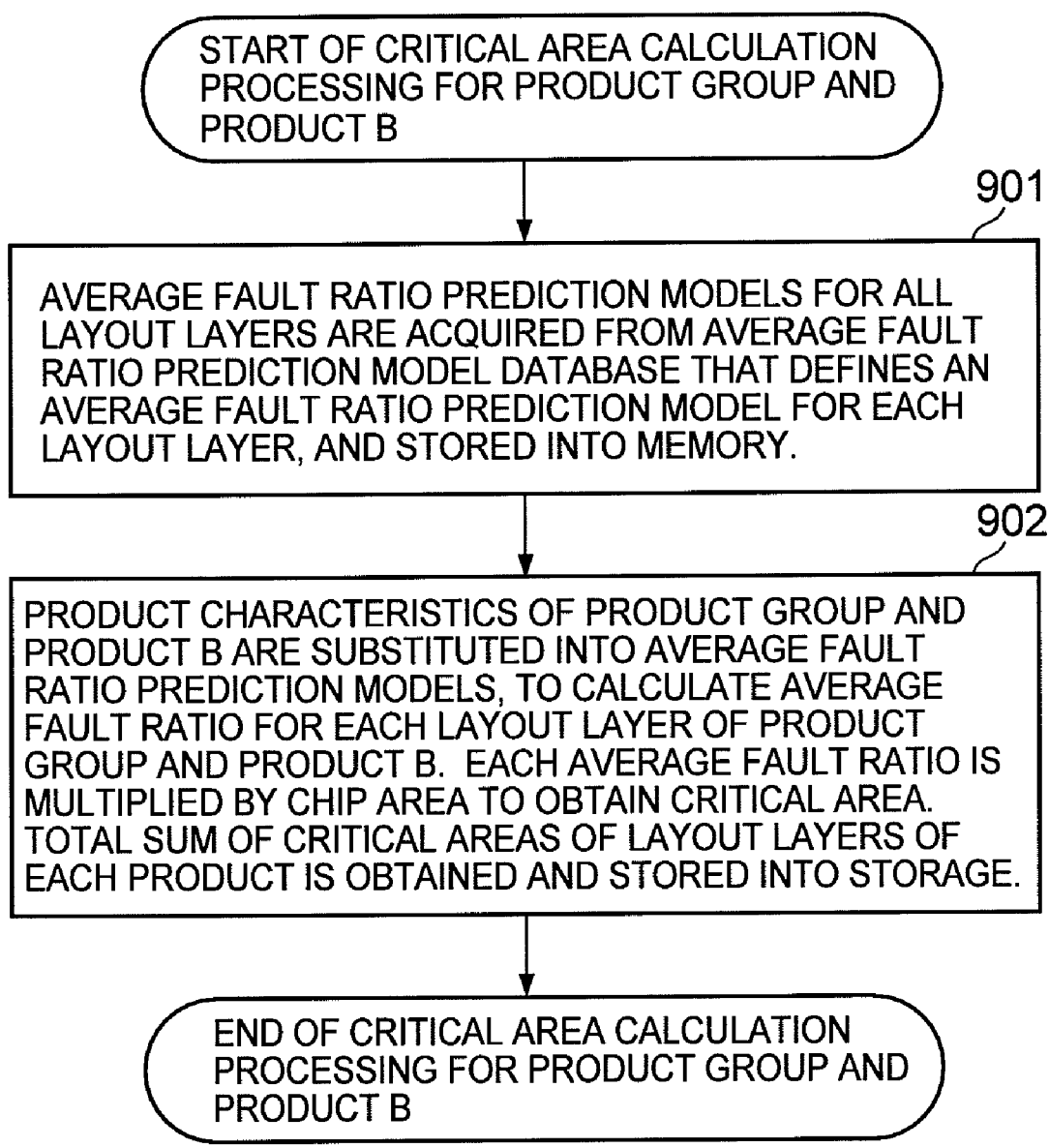
FIG. 9 is a flowchart showing critical area calculation processing.

Next, the critical area calculation processing (Steps 13' and 18' in FIG. 2) performed by the critical area calculation processing part will be described. FIG. 9 shows a flow of the critical area calculation processing of the present embodiment.

The critical area calculation processing part acquires average fault ratio prediction models for all the layers from the average fault ratio prediction model database 202 and stores the acquired models into the memory 28 (Step 901).

Figure 10:
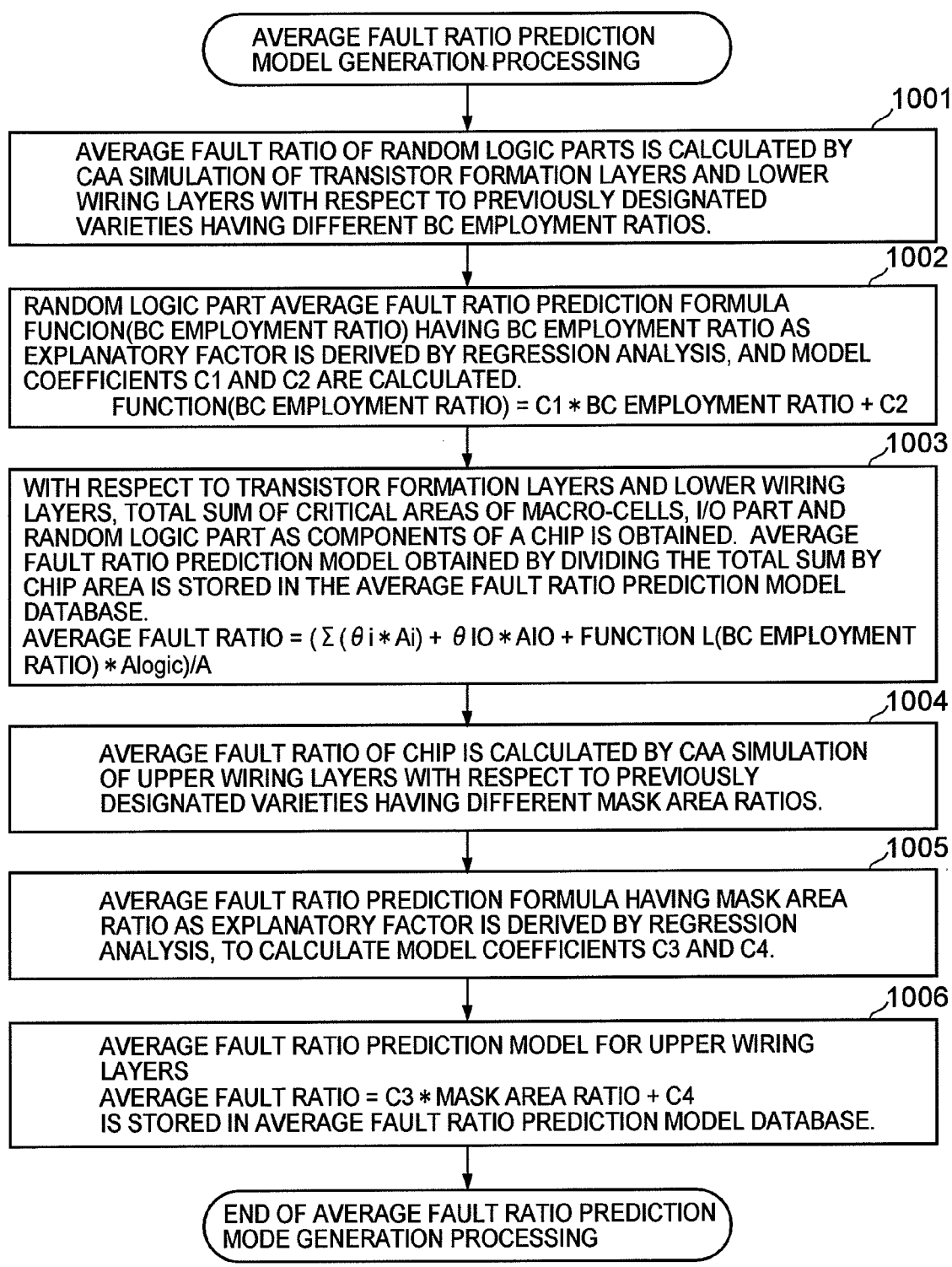
FIG. 10 is a flowchart showing average fault ratio prediction model database generation processing.

Here, processing flow of generating the average fault ratio prediction model database to which the critical area calculation processing part refers will be described referring to FIG. 10.

First, the CAA simulation is performed with respect to previously-designated several varieties having different basic cell employment ratios, to calculate average fault ratios $\theta_{Logic}$ of random logic parts of circuit patterns of the transistor formation layers and the lower wiring layers (Step 1001).

Next, with respect to the circuit patterns of the transistor formation layers and the lower wiring layers, an average fault ratio prediction formula of a random logic part is derived by regression analysis using a basic cell employment ratio as an explanatory factor, and thus model coefficients C1 and C2 are determined (Step 1002).

$\theta_{Logic}$=Function(basic cell employment ratio)=C1× basic cell employment ratio+C2 (Eq. 3')

Next, with respect to the transistor formation layers and the lower wiring layers, the total sum of critical areas of the macro-cells, the I/O part and the random logic part as components of a chip is obtained. Then, an average fault ratio prediction model that obtains an average fault ratio by dividing the above-obtained total sum by the chip area is generated and stored into the average fault ratio prediction model database 202 (Step 1003).

Average fault ratio=(Σ(θi×Ai)+θIO×AIO+Function (basic cell employment ratio)×Alogic)/A (Eq. 4')

where θi is an average fault ratio of a macro-cell, Ai is an area occupied by a macro-cell, θIO is an average fault ratio of the I/O part, AIO is an area occupied by the I/O part, Function (basic cell employment ratio) is an average fault ratio θ Logic of a random logic part, which is determined by a basic cell employment ratio, and A is a chip area.

As for upper wiring layers, the CAA simulation is performed with respect to previously-designated several varieties having different mask area ratios, to calculate an average fault ratio of chips (Step 1004).

As for upper wiring layers, an average fault ratio prediction formula having a mask area ratio as an explanatory factor is derived by regression analysis, to determine model coefficients C3 and C4 (Step 1005). The derived formula is stored into the average fault ratio prediction model database 202 (Step 1006).

Average fault ratio of an upper wiring layer=C3×mask area ratio+C4 (Eq. 5')

The average fault ratio prediction model database 202 is completed as described above, and is stored into the storage 200. FIG. 11 shows an example of the average fault ratio prediction model database 202. One average fault ratio prediction model is generated for each layout layer of the group of products of many varieties different in product characteristics (a chip size, an inner area size, a basic cell employment ratio, kinds of mounted macro-cells, the number of mounted macro-cells, and a mask area ratio). As for the transistor formation layers (layer L and layer FG) and the lower wiring layers (M1-M3), the critical area of a chip is calculated as the total sum of critical areas of the macro-cells, the I/O part and the random logic part as components of the chip, and each model calculates an average fault ratio based on the critical area of the chip. As for the upper wiring layers (M4-M8), it is difficult to predict the average fault ratio of a chip on the basis of only contributions of the components of the chip. Thus, in this case, a prediction model is a prediction regression model that obtains the average fault ratio of a chip from the mask area ratio which is an index of wiring complexity.

The critical area calculation processing part substitutes product characteristics into an average fault ratio prediction model, to calculate an average fault ratio for each layout layer of a product. Then, a critical area is calculated by multiplying the obtained average fault ratio by the chip area. For each product, a total sum of critical areas for each layout layer is obtained and stored into the storage 200 (Step 902 of FIG. 9).

Figure 12:
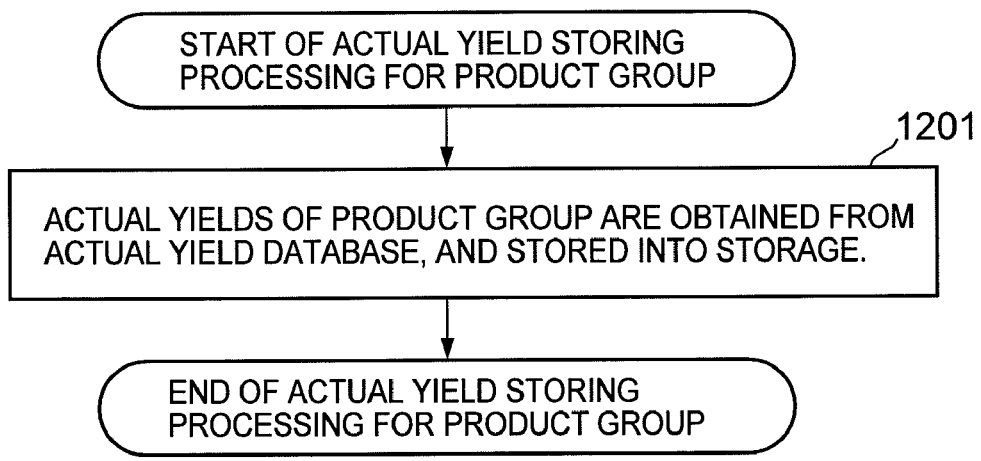
FIG. 12 is a flowchart showing actual yield storing processing.

Next, actual yield storing processing (Step 14' of FIG. 2) will be described. FIG. 12 shows flow of the actual yield storing processing of the present embodiment. In the actual yield storing processing, actual yields of the group of products for which the total sums of critical areas have been calculated are obtained from the actual yield database 204' and stored into the storage 200 (Step 1201).

Figure 13:
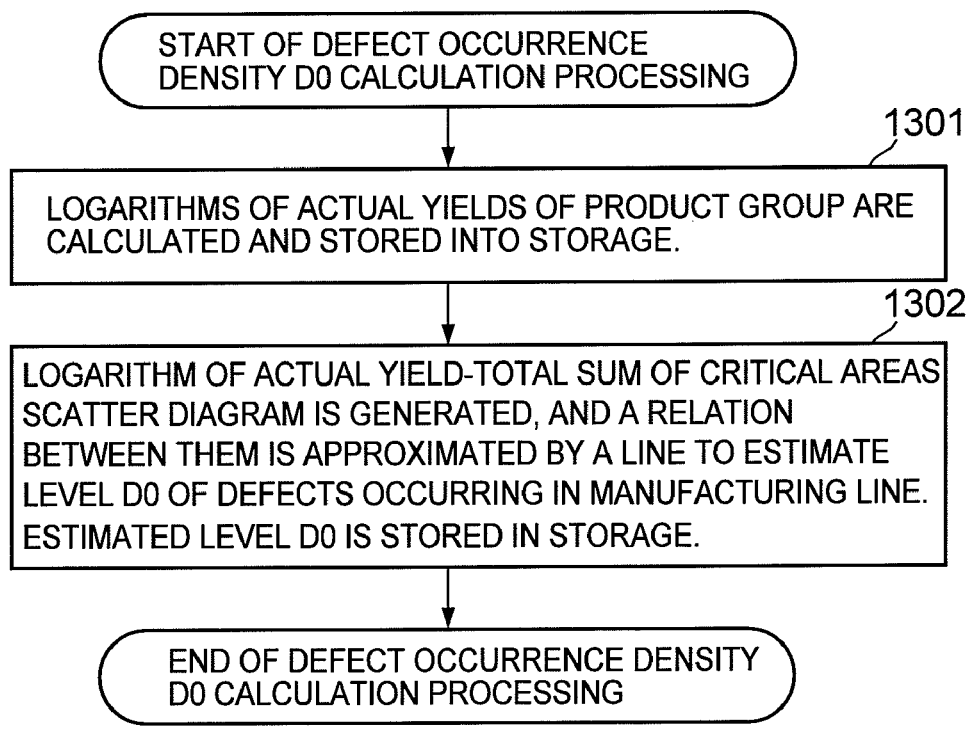
FIG. 13 is a flowchart showing defect density D0 calculation processing.
Figure 14:
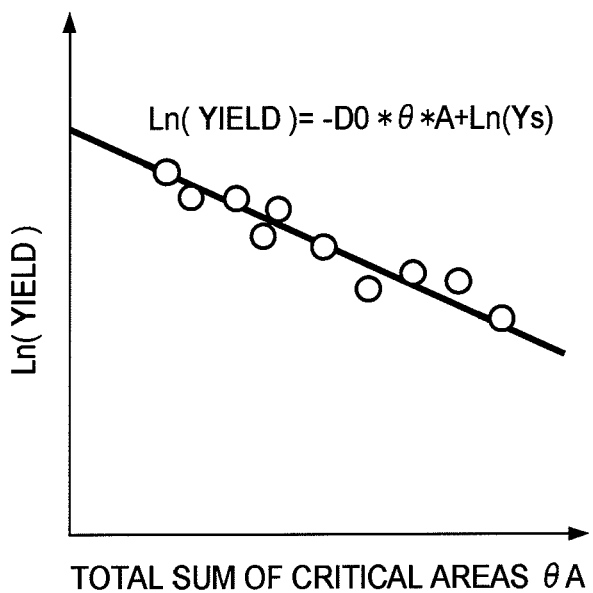
FIG. 14 is a scatter diagram showing the logarithm of actual yield and corresponding critical area of product.

A defect density D0 calculation part (Step 15' of FIG. 2) will be described. FIG. 13 shows flow of defect density D0 calculation processing. In the defect density calculation processing, a logarithm of actual yields of the group of products is calculated and stored into the storage (Step 1301). Next, a logarithm of actual yield-critical area scatter diagram is generated as shown in FIG. 14. A relation between logarithm of actual yield and critical area is approximated by a line. Thus, a level D0 of defects occurring in the manufacturing line is estimated and stored into the storage (Step 1302).

Figure 15:
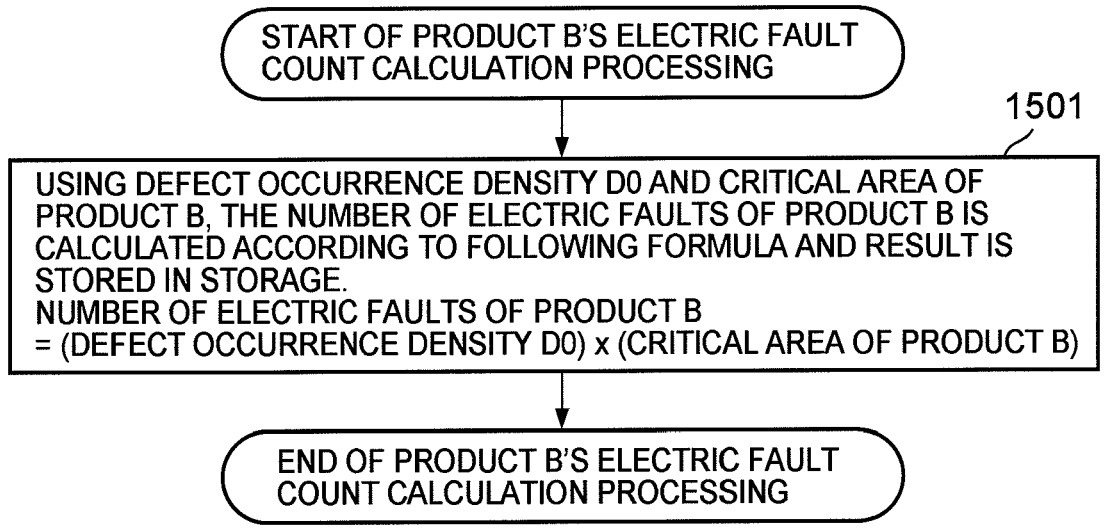
FIG. 15 is a flowchart showing electric fault count calculation processing.

Next, the electric fault count calculation part that calculates the number of electric faults with respect to the product B (Step 19' of FIG. 2) will be described. FIG. 15 shows flow of electric fault count calculation processing. In the electric fault count calculation processing, the number of electric faults with respect to the product B is calculated by the following formula on the basis of the defect density D0 of the manufacturing line and the critical area of the product B (Step 1501).

The number of electric faults of the product $B$=defect density $D0$ of the line×critical area of the product $B$ (Eq. 6')

Figure 16:
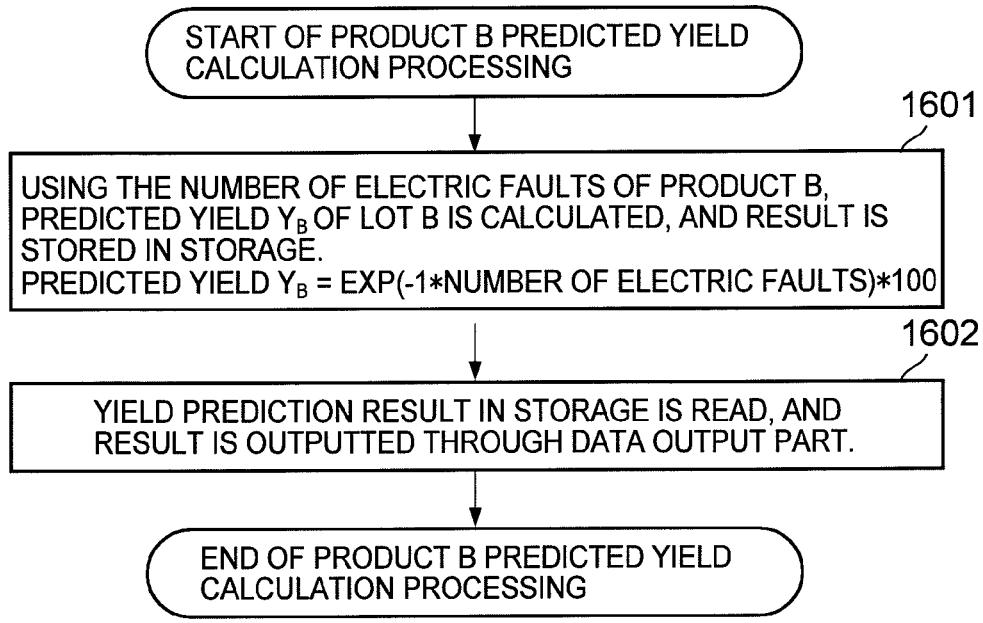
FIG. 16 is a flowchart showing yield prediction processing.

Next, a predicted yield calculation processing part (Step 101 of FIG. 2) for the product B will be described. FIG. 16 shows flow of predicted yield calculation processing. The predicted yield calculation processing part calculates a predicted yield of the product B by using the number of the electric faults of the product B, and stores the result into the storage (Step 1601).

Predicted yield $YB$=exp(−1×the number of electric faults)×100 (Eq. 7')

The result of yield prediction in the storage is read and outputted through the data output part (Step 1602).

As described above, the yield prediction system of the present embodiment can easily predict an average fault ratio of the yield prediction target product B from the product characteristics, and calculate a predicted yield $Y_B$ of the product B, which reflects the average defect density D0 of the manufacturing line, at the time of receiving an order for the product. In other words, it is possible to predict yield with high accuracy and to set an appropriate price in view of sufficient profit, at the time of receiving an order for an electronic device product in manufacturing of a wide variety of products in small quantities by connecting circuit elements (macro-cells) depending on requests of customers.

The above embodiment judges a fault-probability owing to defects only on the basis of diameter of a defect. The present invention is not limited to this. For example, an average fault ratio prediction model may be derived based on a failure ratio calculation result that considers up to remedy allowing for potential of a circuit pattern.

Example 2

Next, another yield prediction system of one embodiment of the present invention will be described referring to drawings.

The yield prediction system of the present embodiment predicts a yield that results from functional failures, in the course of manufacturing an electronic device product B (a prediction target product).

In the present embodiment, optical inspection and electrical inspection are performed on another product A (a reference product) that has already been produced on the manufacturing line, and these inspection results are used for prediction of a yield of the product B. Here, it is assumed that the product A and the product B are family products manufactured in similar processes. In detail, it is assumed that the product A and the product B have the same stacked layer structure although their circuit patters are different, each having structure of staking of one or more circuit layers a, b, c, . . . in order. Further, it is also assumed that the product A and the product B are similar in materials constituting each circuit layer, and also similar in film formation method, exposure method, etching method, and the like, employed for forming each circuit layer. However, respective wiring patterns (including spaces between lines) of circuit layers of the product A and the product B are completely different from each other.

The present embodiment will be described taking, as an example, the case where each of the products A and B is an LSI formed on a wafer, and a yield of a circuit layer c (hereinafter, referred to as the layer c) of the product B is predicted among one or more circuit layers stacked as described above. Prediction of another circuit layer is similar. Yield of the product B as a whole can be obtained by calculating the product of the respective yields of the layers.

Figure 18:
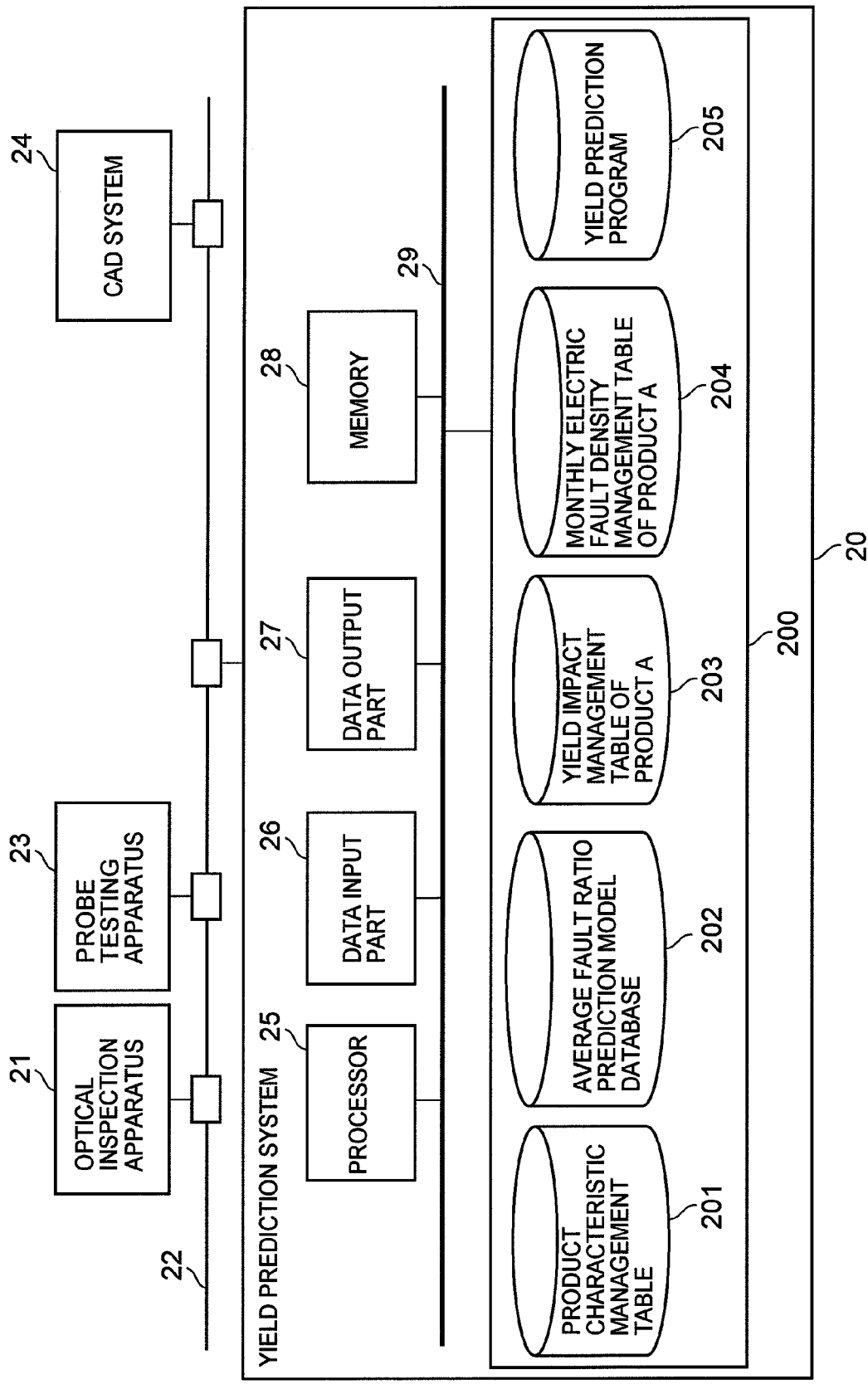
FIG. 18 is a block diagram showing a configuration of a yield prediction system according to one embodiment of the present invention (Example 2)

A configuration of the yield prediction system of the present embodiment will be described. FIG. 18 is a block diagram showing the yield prediction system of the present embodiment. As shown in the figure, the yield prediction system of the present embodiment is connected to external units, namely, a optical inspection apparatus 21, a probe testing apparatus 23 and a CAD system 24 through a local area network 22.

The optical inspection apparatus 21 is an inline inspection apparatus that detects defects such as dust particles and pattern defects optically in the course of wafer manufacturing. The probe testing apparatus 23 is a so-called tester that electrically tests for defects of an electric circuit of a chip on a wafer. The CAD system 24 is an apparatus for designing and developing a layout of a product. In the present embodiment, the CAD system 24 stores layout data (i.e., layout patterns) of the products A and B.

The yield prediction system 20 of the present embodiment comprises: a data input part 26 for receiving calculation conditions and the like from an operator; a data output part 27 for outputting data such as a calculation results to the outside; a storage 200 for storing various programs and data for realizing yield prediction processing; a memory 28 as a temporary storage; a processor 25 for loading the programs stored in the storage 200 into the memory 28 to execute the programs; and a network 29 connecting these component units.

The storage stores: a product characteristic management table 201 that manages product characteristics as factors characterizing a product; an average fault ratio prediction model database 202 for storing average fault ratio prediction models (mentioned below); a yield impact management table 203 for storing yield impact (mentioned below) of the product A; a monthly defect density management table 204 for storing a monthly defect density (mentioned below) of the product A; and a yield prediction program 205 for realizing yield prediction processing.

When the processor 25 loads the yield prediction program 205 into the memory 28 and executes the program 205, then the program 205 realizes: a yield impact calculation processing part that calculates yield impact, i.e., a degree of impact of one defect in a prescribed layer of an already-manufactured product, on yield; a monthly average defect count calculation processing part that calculates the monthly average number of defects in a predetermined layer of an already-manufactured product; a monthly electric fault density calculation processing part that calculates monthly electric fault density, i.e., the density of electric faults (defects as causes of a failure product) in a predetermined layer of an already-manufactured product; a product characteristic acquisition part that acquires product characteristics of a product; an average fault ratio calculation processing part that calculates an average fault ratio θ, i.e., a ratio of electric faults (defects as causes of a failure product) among defects occurring in a predetermined layer of a product at the time of manufacturing; a prediction target product monthly electric fault density calculation processing part that calculates monthly electric fault density of a prediction target layer of a yield prediction target product; a manufacturing history acquisition processing part that acquires a manufacturing history of a prediction target lot of the yield prediction target product; and a yield calculation processing part that calculates yield of the prediction target layor of the prediction target lot of the yield prediction target product.

Next will be described an outline of a procedure in which the yield prediction system 20 of the present embodiment performs optical inspection and electrical inspection on another product A that has been already manufactured in the manufacturing line, and the inspection results are used for predicting yield of the product B.

Figure 19:
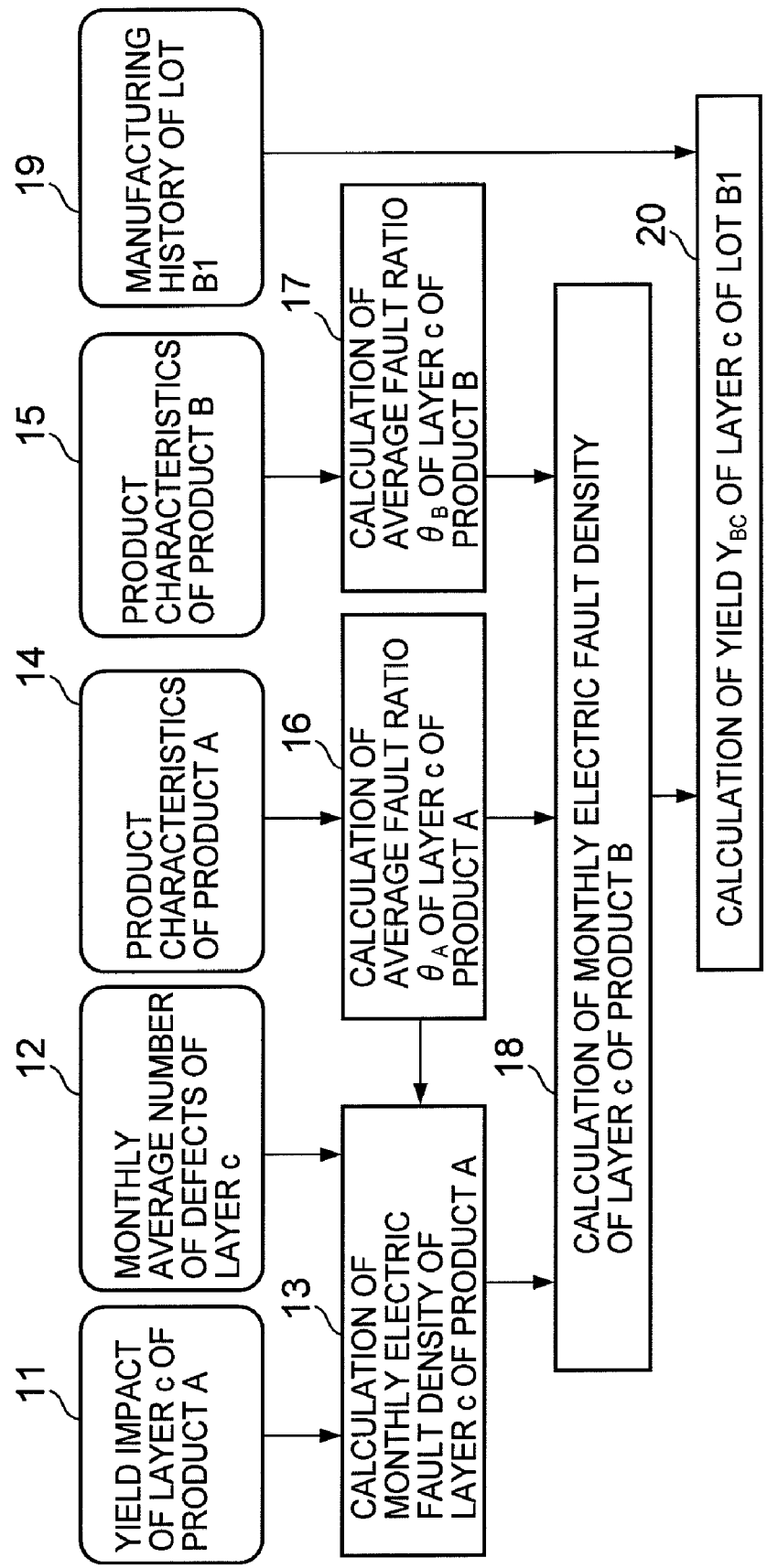
FIG. 19 is a diagram explaining an outline of a yield prediction procedure.

Now, an outline of a yield prediction procedure of the present embodiment, which is performed through various functions respectively, will be described. FIG. 19 is a diagram for explaining yield prediction procedure performed by the processing parts of the yield prediction system 20 of the present embodiment.

First, the yield impact calculation processing part calculates yield impact of the layer c of the product A (Step 11). Here, optical inspection result data 31 of the layer c of the product A, which are stored in the optical inspection apparatus 21, and electrical inspection result data 35 of the product A, which are stored in the probe testing apparatus 23, are used to calculate the probability (i.e. yield impact) KRc that an LSI chip of the product A becomes a fail chip owing to one defect in the layer c. The yield impact calculation processing part performs this processing with respect to a plurality of wafers, to calculate an average yield impact KRc owing to a defect in the layer c of the product A. The yield impact KR is a quantity that indicates the sensitivity of layout to defect, and accordingly it is sufficient to calculate an average yield impact KR once for a plurality of wafers.

Further, the monthly average defect count calculation processing part calculates the monthly average number of defects of the layer c of the product A (Step 12). Here, the monthly average defect count calculation processing part reads the optical inspection result data 31 obtained for one month in the step where the product A is manufactured up to the layer c from the external optical inspection apparatus 21 through the network 22. Then, after screening abnormal value out of the optical inspection result data 31, the obtained value is calculated as the monthly average number of defects. The processing of calculating monthly average number of defects is performed every month.

The monthly electric fault density calculation processing part calculates a monthly electric fault density, i.e., the number of electric faults (defects causing a failure product) per unit area among defects in the layer c of the product A, by using the yield impact KRc of the layer c of the product A (which has been calculated by the yield impact calculation processing part) and a monthly average defect density obtained by dividing the monthly average number of defects (which has been calculated by the monthly average defect count calculation processing part) by the inspected area (Step 13). The density of defects causing a failure product in the layer c of the product A can be calculated by multiplying the probability that one defect in the layer c of the product A causes a failure product by the average defect density of the defects occurred in the layer c in the month in question.

Next, with respect to each of the products A and B, the product characteristic acquisition processing part acquires product characteristics as factors characterizing a gate array product from the product characteristic management table 201 (Steps 14 and 15). The product characteristics include, for example, a chip size that determines the extent of the number of mountable logic gates, a logic part area ratio, i.e., a ratio of connected logic gates to chip area, an SRAM occupancy, i.e., a ratio of a mounted SRAM parts to chip area, and the like.

Then, the average fault ratio calculation processing part calculates an average fault ratio $\theta_A$ of the layer c of the product A by using the product characteristics of the product A, which have been obtained by the product characteristic acquisition processing part, and the below-mentioned average fault ratio prediction model (Step 16). Further, the average fault ratio calculation processing part calculates an average fault ratio $\theta_B$ of the layer c of the product B by using the same average fault ratio prediction model and the product characteristics of the product B (Step 17). The method of calculation will be described later.

Next, the prediction target product monthly electric fault density calculation processing part calculates a monthly electric fault density of the layer c of the product B from a ratio of the average fault ratio $\theta_A$ of the layer c of the product A to the average fault ratio $\theta_B$ of the layer c of the product B, which have been calculated by the average fault ratio calculation processing unit, and the monthly electric fault density of the layer c of the product A, which has been calculated by the monthly electric fault density calculation processing part (Step 18). The product A and the product B are products manufactured by the same process. Thus, the electric fault density of the month in question, which corresponds to the product of the total number of defects occurring in the layer c and the average fault ratio $\theta_B$ of the layer c, can be calculated by multiplying the monthly electric fault density of the layer c of the product A by a ratio $\theta_B/\theta_A$ of the average fault ratio $\theta_B$ of the layer c of the product B to the average fault ratio $\theta_A$ of the layer c of the product A.

Further, the manufacturing history acquisition processing part acquires the month in which processing of the layer c has been performed with respect to a lot B1 as the target lot of prediction of yield of the product B from the manufacturing history of the lot B1 (Step 19). Here, the manufacturing history means the month of the launch of transistor formation layer, the month of the launch of wiring layer, and the expected month of electrical inspection, i.e., the month of yield prediction. Input of manufacturing history is received from the operator through the data input part 26.

The yield calculation processing part calculates yield $Y_{BC}$ of the layer c of the lot B1 of the product B from the monthly electric fault density of the layer c of the product B of the month in question, which has been derived from the monthly electric fault density calculation processing part and the manufacturing history of the lot B1 by using the Poisson's yield prediction formula (Step 20).

Thus, according to the above-described steps, it is possible to predict the yield $Y_B$ of the layer c of the lot B1 of the product B in the course of manufacturing, by the calculation based on the optical inspection result on the layer c of the product A, the electrical inspection result on the same wafer for which the optical inspection result has been obtained, the monthly average number of defects in the layer c of the product A, the product characteristics of the product A, the product characteristics of the product B, and the manufacturing history of the lot B1.

Next, operation of the yield prediction system of the present embodiment will be described in detail for each of Steps 11-20 shown in FIG. 19.

First, yield impact calculation processing performed by the yield impact calculation processing part will be described (Step 11 of FIG. 19).

Figure 20:
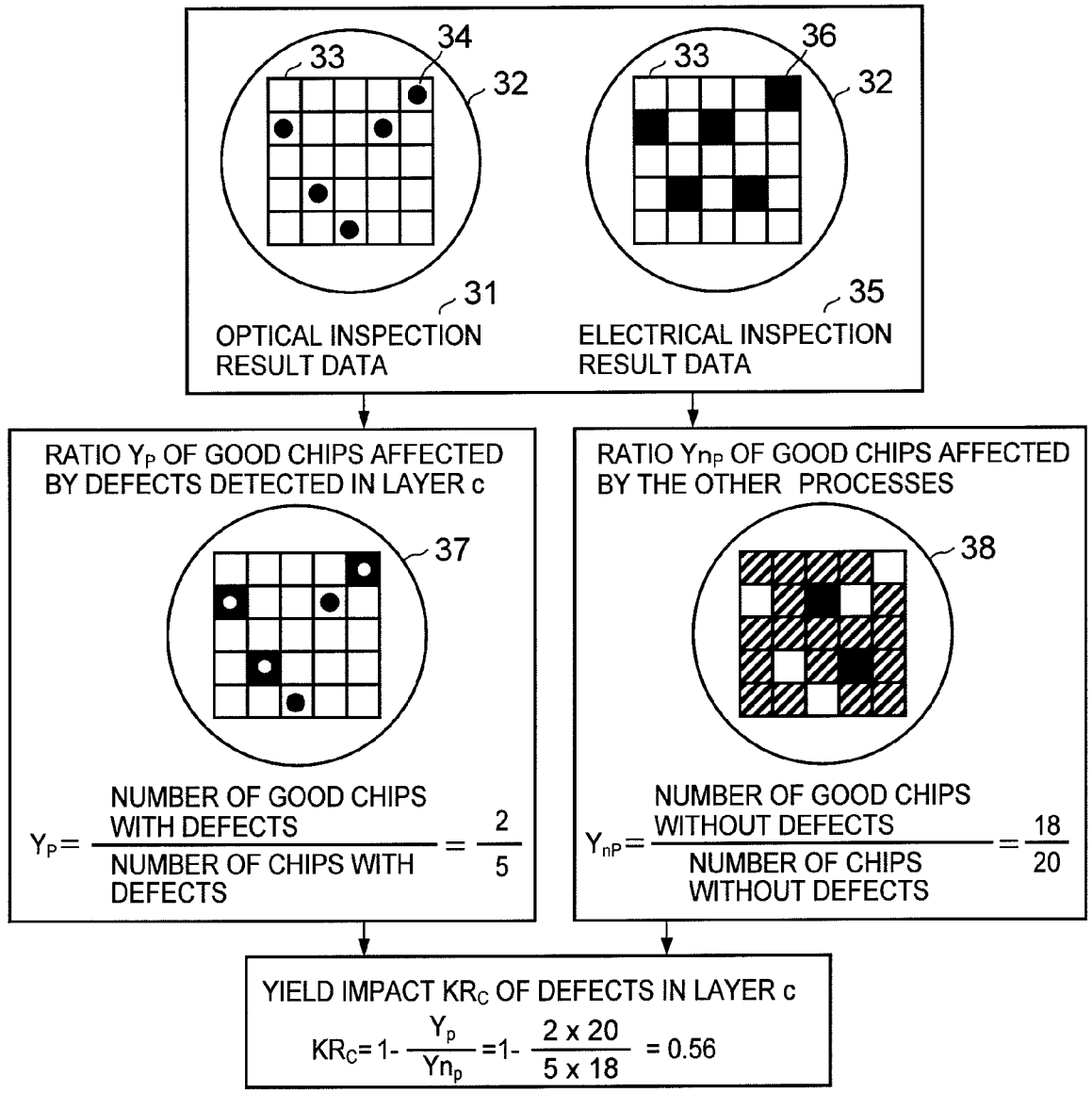
FIG. 20 is a diagram explaining an outline of calculation of yield impact.

First, an outline of the processing of calculation of the yield impact KRc from the optical inspection result data 31 and the electrical inspection result data 35 of the layer c of the product A will be described. Here, the impact on the yield of the layer c as the yield prediction target layer is obtained by calculating a ratio of good chips affected by a defect and a ratio of good chips affected by the other processes on the basis of the mentioned data. FIG. 20 is a diagram explaining an outline of the calculation of the yield impact KR according to the present embodiment.

First, the yield impact calculation processing part reads the optical inspection result data 31 of the product A from the optical inspection apparatus 21 and the electrical inspection result data 35 of the product A from the probe testing apparatus 23.

The optical inspection result data 31 are data as a result of optical inspection performed in the step where the product A has been manufactured up to the layer c. As shown in FIG. 20, the optical inspection result data 31 shows the LSI chips 33 in which defects 34 exist, among the LSI chips formed on a wafer 32. The optical inspection result data 31 include a product name, an inspection process name, a lot number, a wafer number, defect coordinate data, and the like.

Further, the electrical inspection result data 35 are data as a result of inspection performed by the probe testing apparatus 23 to see whether a chip is good (pass) or bad (fail), in the step where all the circuit patterns are formed on a wafer 32 of the product A. As shown in FIG. 20, the electrical inspection result data 35 show locations of chips 36 that are electrically defective among the LSI chips 33 formed on the wafer 32. The electrical inspection result data 35 include product name, test name, lot number, wafer number, chip quality (pass or fail), and the like.

The yield impact calculation processing part calculates a ratio Yp of good chips affected by the defects detected in the layer c, by using the optical inspection result data 31. Here, chips on which defects 34 exist (chips with defect) are extracted from the chips 33 on the wafer 32, and the number of the chips with defect is counted. Next, the data 37 that specify the chips on which the defects 34 exist are compared with the electrical inspection result data 35. Among the chips with a defect in the layer c, the number of chips that are finally judged to be good by the electrical inspection result is counted. In the example of FIG. 20, five chips have a defect in the layer c. Among them, two chips are judged to be good by the electrical inspection result. Then, a ratio of the number of good chips to the number of chips with a defect is calculated and obtained as the ratio Yp of good chips affected by defects in the layer c.

Further, the yield impact calculation processing part calculates a ratio Ynp of good chips affected by other processes with respect to a specific layer (here, assumed as the layer c), by using the optical inspection result data 31. Here, among the chips 33 on the wafer 32, chips on which no defect 34 exists (chips without defect) are extracted, and the number of the chips without defect is counted. The result of the extraction is shown in the hatched part of the data 38 in FIG. 20. Next, the data 38 are compared with the electrical inspection result data 35, and the number of chips that are finally judged to be good chips by the electrical inspection result is counted among the chips without a defect in the layer c. In the example of FIG. 20, twenty chips have no defect in the layer c, and, among these chips, eighteen chips become good chips as a result of the electrical inspection. A ratio of the good chips to the chips without defect is calculated to obtain the ratio Ynp of good chips affected by defects other than those in the layer c.

Then, a ratio of good chips affected only by the defects in the layer c can be determined by dividing the ratio Yp of good chips affected by the defects of the layer c by the ratio Ynp of good chips affected by the other defects than ones in the layer c. As a result, 1−Yp/Ynp indicates a ratio of failure chips owing to only the defects in the layer c, that is to say, the impact of one defect on the layer c on the yield.

Figure 21:
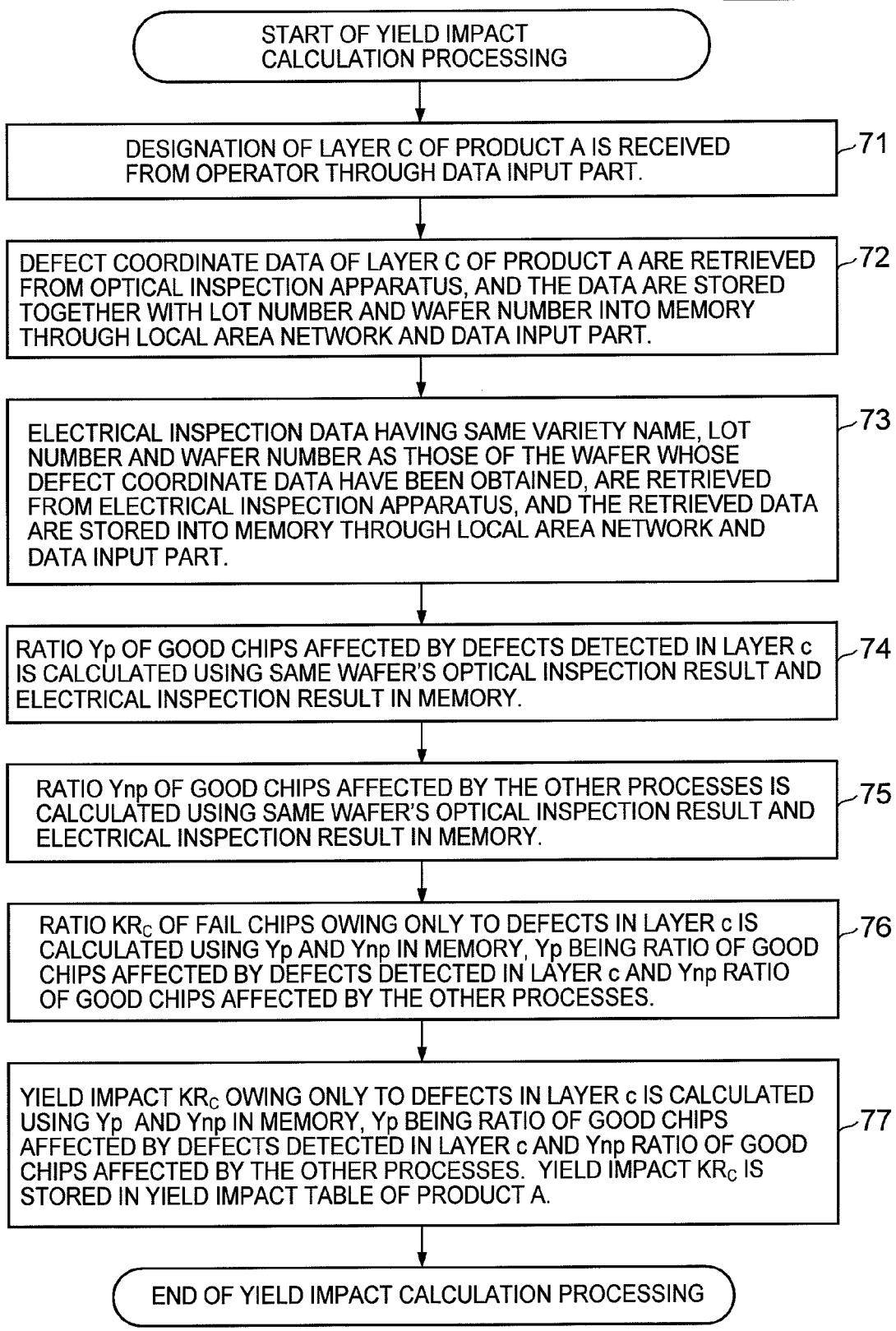
FIG. 21 is a flowchart showing yield impact calculation processing.

The above processing will be described as processing flow. FIG. 21 shows flow of the yield impact calculation processing of the present embodiment. The present processing can be performed at any time before the monthly electric fault density calculation processing calculates the monthly electric fault density. Here, it is assumed that the processing is started being triggered by user's input of designation of the layer c of the product A.

The yield impact calculation processing part receives designation of the target of the yield impact storing processing, i.e., the layer c of the product A through the data input part 26 (Step 71).

Next, the yield impact calculation processing part extracts the optical inspection result data 31 (which include defect coordinate data of the layer c of the product A) stored in the optical inspection apparatus 21, and receives the extracted data through the network 22 and the data input part 26, and stores the data into the memory 28 (Step 72). By the processing of Step 72, the optical inspection result data 31 that indicate on which LSI chips 33 the defects 34 exist in the layer c, among the LSI chips 33 of the product A formed on the wafer 32, can be stored into the memory 28.

Next, the yield impact calculation processing part extracts the electrical inspection result data 35 with respect to the same wafer of the optical inspection result data 31 obtained in Step 72 from the probe testing apparatus 32, and receives the extracted data through the network 22 and the data input part 26, and stores the data into the memory 28 (Step 73). By the processing of Step 73, the data 35 that indicate on which LSI chips 33 the electrical defects exist among the LSI chips 33 of the product A formed on the wafer 32 can be stored into the memory 28.

Next, the yield impact calculation processing part uses the optical inspection result data 31 and the electrical inspection result data 35 to calculate the ratio of the number of good chips among chips with a defect in the layer c, to obtain the ratio Yp of good chips affected by the defects in the layer c, as described referring to FIG. 20 (Step 74).

Further, using the optical inspection result data 31 and the electrical inspection result data 35, the yield impact calculation processing part calculates the ratio of the number of good chips among chips without defect in the layer c, to obtain the ratio Ynp of good chips affected by the other causes than the defects in the layer c, as described referring to FIG. 20 (Step 75).

Then, as described referring to FIG. 20, the ratio Yp of good chip affected by defects in the layer c and the ratio Ynp of good chips affected by the other causes than the defects in the layer c are used to calculate 1−Yp/Ynp, to obtain the ratio of fail chips owing only to the defects in the layer c, i.e. the yield impact KRc of one defect in the layer c (Step 76).

Yield impacts KRc of the layer c of the product A are calculated using inspection results of a plurality of wafers, and their average value is stored into the yield impact management table 203 of the product A (Step 77).

Here, a configuration of the yield impact management table 203 will be described. The yield impact management table 203 manages yield impacts in association with names of layers of a product for which yield impact KR is calculated. FIG. 22 shows an example of the yield impact management table 230 of the present embodiment. As shown in the figure, the yield impact management table 203 has: a layer name storing column 2031 for registering a name (a layer name) specifying a layer for which yield impact has been calculated; and a yield impact storing column 2032 for registering yield impact KR calculated with respect to the layer stored in the layer name storing column according to the above-described procedure. In Step 77, yield impact KRc is stored in association with the layer c.

Next, monthly average defect count calculation processing (Step 12 of FIG. 19) performed by the monthly average defect count calculation part. FIG. 23 shows flow of the monthly average defect count calculation processing of the present embodiment. This processing is performed monthly in order to reflect a situation of occurrence of defects in the manufacturing line on the predicted value of yield.

As shown in the figure, the monthly average defect count calculation processing part uses a calendar function or the like of the yield prediction system 20 to start the processing when predetermined date and time has come. Here, it is assumed, for example, that the processing is started at a predetermined time of the first day of each month.

The monthly average defect count calculation processing extracts defect coordinate data registered the previous month among defect coordinate data stored within the optical inspection apparatus 21 with respect to the layer c of a group of products that are manufactured by a process similar to the process for the product A, and then stores the extracted data as the optical inspection result data 31 into the memory 28 via the local network 22 and the data input part 26 (Step 92). In the case where the present processing is to be performed not on the first day of the month, it is sufficient to extract defect coordinate data that have been registered for one month before the date on which the present processing is to be performed.

The monthly average defect count calculation processing part calculates the total number of defects and its standard deviation σ of the defect coordinate data in the memory 28. Then, using only wafers for which the total number of defects is the average value ±2σ, the monthly average defect count calculation processing part takes the average to calculate the monthly average number of defects. The calculated monthly average number of defects is stored into the memory 28 (Step 93).

Next, monthly electric fault density calculation processing (Step 13 of FIG. 19) performed by the monthly electric fault density calculation processing part will be described. FIG. 24 shows a flow of the monthly electric fault density calculation processing of the present embodiment. This processing is performed monthly in order to reflect a situation of occurrence of electric faults in the layer c on the predicted value of yield.

As shown in the figure, the monthly electric fault density calculation processing part uses the calendar function or the like of the yield prediction system 20 to start the processing when predetermined date and time has come. Here, it is assumed, for example, that the processing is started at a predetermined time of the first day of each month. For example, the processing may be started being triggered by the monthly average defect count calculation processing part calculating the monthly average number of defects and storing it into the memory 28.

As the monthly electric fault density $D_{AC}$ of the layer c of the product A, KRc×(monthly average number of defects)/($S_A$×N) is calculated by using the yield impact KRc of the layer c (which has been stored in the yield impact management table 203 of the product A), the monthly average number of defects in the layer c (which is in the memory 28), the chip area $S_A$ of the product A, and the number N of chips on a wafer of the product A. The calculated monthly electric fault density $D_{AC}$ is stored in the monthly electric fault density management table 204 of the product A (Step 102).

Here, a configuration of the monthly electric fault density management table 204 will be described. The monthly electric fault density management table 204 is generated for one product that is taken as the standard for yield prediction. FIG. 25 shows an example of the monthly electric fault density management table 204 of the present embodiment. As shown in the figure, the monthly electric fault density management table 204 stores the electric fault density of each layer for each month. The monthly electric fault density management table 204 has: a layer name storing column 2041 for registering a name (a layer name) of a layer for which the electric fault density has been calculated; and a electric fault density storing column 2042 for storing the electric fault density of each layer for each month.

In the calculation of Step 102, the monthly electric fault density calculation processing part obtains the chip area $S_A$ of the product A from the below-described product characteristic management table 201 and the number N of chips on a wafer 32 of the product A is given in advance as a fixed value. Or, the number N may be stored in the below-described product characteristic management table 201.

Next, product characteristic acquisition processing (Steps 14 and 15 of FIG. 19) performed by the product characteristic acquisition processing part will be described. FIG. 26 shows a flow of the product characteristic acquisition processing of the present embodiment.

Product characteristics of the product A as the reference product and product characteristics of the product B as the prediction target product are acquired from the product characteristic management table 201 and stored into the memory 28 (Step 121).

Here, a configuration of the product characteristic management table 201 will be described. As product characteristics that characterize each product, the product characteristic management table 201 stores a chip size (cm), an SRAM occupancy (%) and a logic part area ratio (%) for each product. From these pieces of information, a chip area, an SRAM part area (i.e. an area occupied by an SRAM part), a logic part area (i.e., an area occupied by a logic part) and an area of a non-used part are clearly known. FIG. 27 shows an example of design layout of a gate array product of the present embodiment. As shown in the figure, the area $S_{SRAM}$ occupied by the SRAM part is obtained by (SRAM occupancy×chip area), and the area $S_{Logic}$ occupied by the logic part is obtained by (logic part area ratio×chip area).

FIG. 28 shows an example of the product characteristic management table 201. The product characteristic management table 201 has a variety name column 2011 for storing a product name and a feature quantity storing column 2012 for storing feature quantities of each product. Product characteristics managed by the product characteristic management table 201 are not limited to those shown in the figure. For example, the table 201 may store the above-mentioned number of chips or the below-mentioned wiring area.

Figure 29:
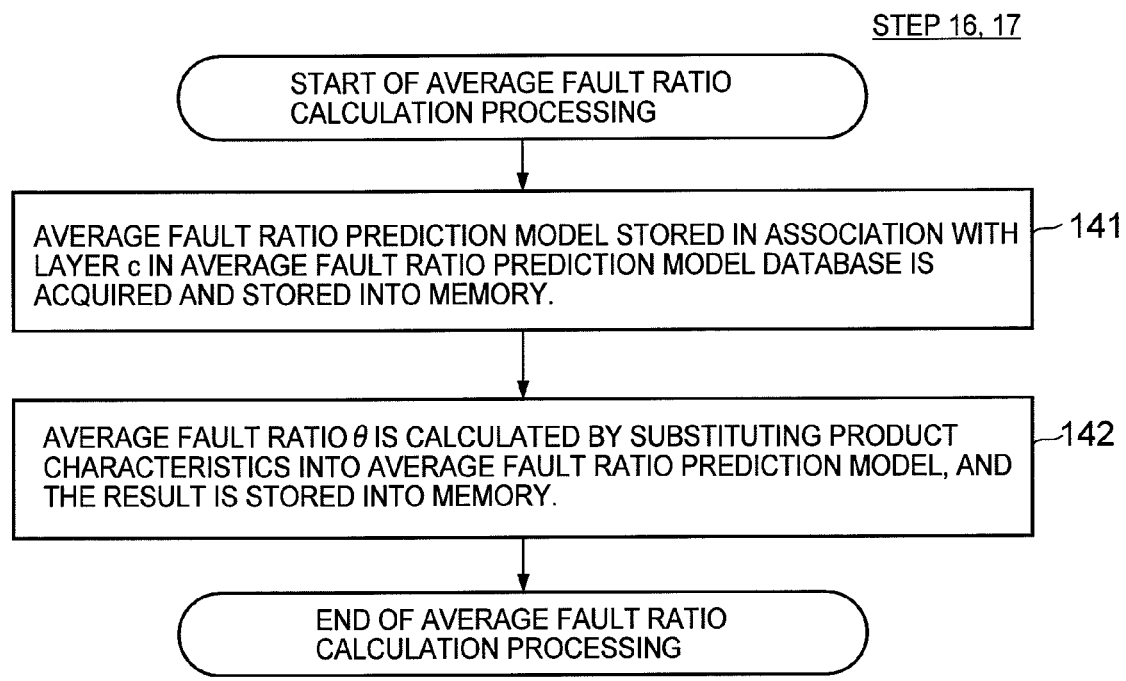
FIG. 29 is a flowchart showing average fault ratio calculation processing.

Next, average fault ratio calculation processing (Steps 16 and 17 of FIG. 19) performed by the average fault ratio calculation processing part will be described. FIG. 29 shows a flow of the average fault ratio calculation processing of the present embodiment.

The average fault ratio calculation processing part acquires the average fault ratio prediction model for a circuit pattern of the layer c from the average fault ratio prediction model database 202, and stores the acquired model into the memory 28 (Step 141).

Here, average fault ratio prediction model database generation processing referred to by the average fault ratio calculation processing part will be described referring to FIGS. 30 to 33.

Figure 30:
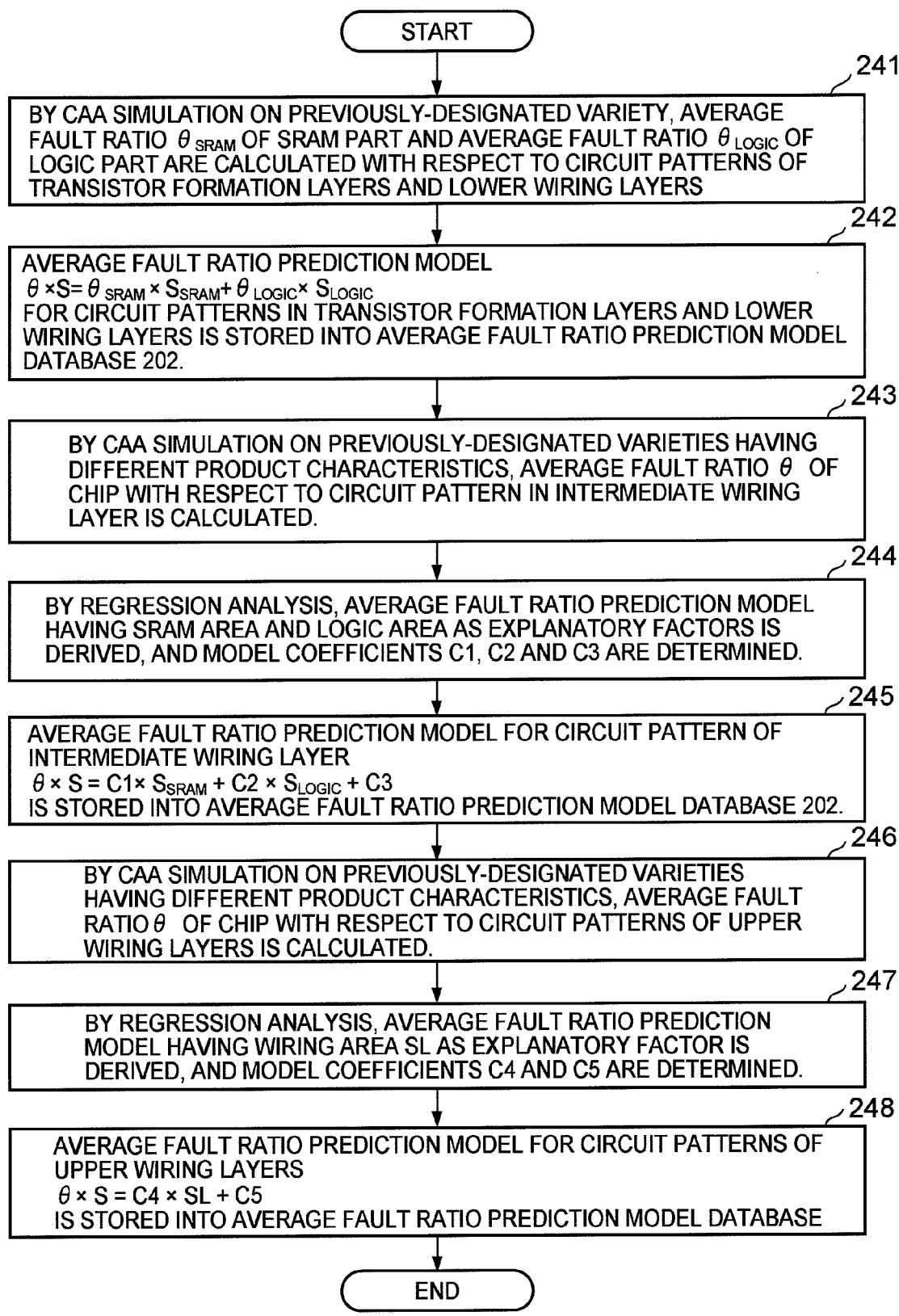
FIG. 30 is a diagram showing an example of average fault ratio prediction model generation processing.

FIG. 30 shows a flow of average fault ratio prediction model generation processing.

The average fault ratio calculation processing part performs the CAA simulation with respect to a previously-designated variety to calculate an average fault ratio $\theta_{SRAM}$ for circuit patterns of transistor formation layers and lower wiring layers and an average fault ratio $\theta_{Logic}$ for logic parts (Step 241).

The average fault ratio calculation processing part stores an average fault ratio prediction model $$\theta \times S = \theta_{SRAM} \times S_{SRAM} + \theta_{Logic} \times S_{Logic} \quad \text{(Eq. 2)}$$

for circuit patterns of the transistor formation layers and the lower wiring layers into the average fault ratio prediction model database 202 (Step 242).

The average fault ratio calculation processing part performs the CAA simulation with respect to previously-designated varieties having different product characteristics, to calculate an average fault ratio θ of chips in circuit patterns in intermediate wiring layers (Step 243).

The average fault ratio calculation processing part derives an average fault ratio prediction model having an SRAM area and a Logic area as explanatory factors by the regression analysis, to determine model coefficients C1, C2 and C3 (Step 244).

The average fault ratio calculation processing part stores the average fault ratio prediction model $$\theta \times S = C1 \times S_{SRAM} + C2 \times S_{Logic} + C3 \quad \text{(Eq. 3)}$$

for the circuit patterns in the intermediate wiring layers into the average fault ratio prediction model database 202 (Step 245).

The average fault ratio calculation processing part performs the CAA simulation with respect to previously-designated varieties having different product characteristics from each other to calculate an average fault ratio θ of chips in circuit patters in upper wiring layers (Step 246).

The average fault ratio calculation processing part derives an average fault ratio prediction model having a wiring area $S_L$ as an explanatory factor to determine model coefficients C4 and C5 (Step 247).

The average fault ratio calculation processing part stores an average fault ratio prediction model $$\theta \times S = C4 \times S_L + C5 \quad \text{(Eq. 4)}$$

for circuit patterns of the upper wiring layers into the average fault ratio prediction model database (Step 248).

Now, details will be described.

FIG. 31 shows an example of the average fault ratio prediction model database 202. As shown in the figure, the average fault ratio prediction model database 202 registers, for each layer name 2021, a circuit pattern 2022 affected by a defect detected in that layer and an average fault ratio prediction model 2023.

A circuit pattern 2022 is a pattern stacked on a silicon wafer in the course of manufacturing a gate array product, and corresponds to a mask layout pattern. In the example of FIG. 31, layers are classified into transistor formation layers (L and FG) in which individual gate modules are formed and wiring layers in which SRAMs are formed. The wiring layers are further classified into a lower layer (M1), an intermediate layer (M2) and an upper layer (M3).

An average fault ratio prediction model 2023 is obtained for each circuit pattern 2022 as described in the following.

A critical area of a chip, which is a product of the average fault ratio θ of the chip and the chip area S, is expressed as a sum of critical areas of elements constituting the chip. Among the elements constituting a chip, those that are connected and affect yield of the chip are an SRAM part and a Logic part.

For example, in the case of a product that comprises a SRAM part, a Logic part and another part, the critical area θ*S of a chip is expressed by the following formula $$\theta^* S = \theta_{SRAM}^* S_{SRAM} + \theta_{Logic}^* S_{Logic} + \theta_{Other}^* S_{Other} \quad \text{(Eq. 5)}$$

by using the average fault ratio $\theta_{SRAM}$ of the SRAM part, the area $S_{SRAM}$ of the SRAM part, the average fault ratio $\theta_{Logic}$ of the Logic part, the area $S_{Logic}$ of the Logic part, the average fault ratio $\theta_{Other}$ of the other part and the area $S_{Other}$ of the other part.

Here, the part other than the SRAM part and the Logic part does not affect yield of a chip as described above even if a circuit pattern is formed from the viewpoint of layout, and thus is an area for which the kill ratio becomes zero. Accordingly, the third term on the right side of Eq. 5 is deleted, and the average fault ratio prediction model is expressed by the following formula.

$$\theta^* S = \theta_{SRAM}^* S_{SRAM} + \theta_{Logic}^* S_{Logic} \quad \text{(Eq. 6)}$$

In the circuit patterns (L, FG) of the transistor formation layers where individual gate modules are formed and the circuit pattern (M1) of the lower wiring layer where gate modules are wired to form an SRAM, only the SRAM part and the Logic part affect the yield, and the other part does not affect the yield. Accordingly, in these circuit patterns 2022, the average fault ratio prediction model expressed by (Eq. 6) constructed only by the sum of the critical areas of the SRAM part and the Logic part can be used as it is. Thus, the average fault ratio calculation processing part stores the above formula (Eq. 6) as the average fault ratio prediction models 2023 for these circuit patterns 2022. The average fault ratio $\theta_{SRAM}$ of the SRAM part and the average fault ratio $\theta_{Logic}$ of the Logic part can be obtained by the below-described Critical Area Analysis (CAA) simulation.

On the other hand, in the circuit pattern (M2) of the intermediate wiring layer, wiring for connecting adjacent circuit blocks and wiring for leading in electrical signals from upper wiring layer are formed. Accordingly, a part other than the SRAM part and the Logic part is also wired, and this affects the yield. Thus, it is not possible to derive an average fault ratio prediction model 2023 only by the sum of the critical areas of the SRAM part and the Logic part as in the case of the lower wiring layer. Thus, several varieties (for example, five varieties) having different feature quantities are selected from the group of products that are manufactured by process similar to the process for the product A, and the below-described CAA simulation is performed for each of the selected varieties to calculate an average fault ratio $\theta$ of a chip as a whole. Then, the regression analysis is performed to derive an average fault ratio prediction model 2023 having the SRAM area and the Logic area as explanatory factors.

In detail, regression analysis is performed using the product (corresponding to output Y) of the average fault ratio $\theta$ of a chip, which have been obtained from the selected five varieties of products, and the chip area S, and the SRAM part area and the Logic part area (corresponding to input X) among the feature quantities of the selected five varieties of products, to calculates model coefficients C1 and C2 for the SRAM part area and the Logic part area and a constant C3.

Here, the derived average fault ratio prediction model 2023 is shown as (Eq. 7).

$$\theta * S = C1 * S_{SRAM} + C2 * S_{Logic} + C3 \quad \text{(Eq. 7)}$$

The average fault ratio calculation processing part stores (Eq. 7) as the average fault ratio prediction model 2023 for the circuit pattern (M2) of the intermediate wiring layer.

FIG. 32 shows an example of distribution of product characteristics of family products manufactured by a process similar to the process for the product A. To derive the average fault ratio prediction model 2023 for the circuit pattern of the intermediate wiring layer, a predetermined number of products are selected from this group of products.

Further, the circuit pattern (M3) in the upper wiring layer is one for forming wiring that receives and delivers electrical signals between circuit blocks arranged over the chip, and thus wiring length is long. Thus, similarly to the case of the intermediate wiring layer, varieties (for example, five varieties) having different feature quantities are selected, and the below-described CAA simulation is performed for each of the selected varieties to calculate the average fault ratio $\theta$ of a chip. Then, the regression analysis is performed to derive an average fault ratio prediction model 2023 having the wiring area $S_L$ as an explanatory factor.

In detail, the regression analysis is performed using the product (corresponding to output Y) of the average fault ratio $\theta$ of a chip, which has been obtained from five varieties of products, and a chip area S, and a wiring area (corresponding to input X) among product characteristics of the five varieties of products, to determined a model coefficient C4 for the wiring area and a constant C5.

The derived average fault ratio prediction model 2023 is shown as (Eq. 8)

$$\theta * S = C4 * S_L + C5 \quad \text{(Eq. 8)}$$

The average fault ratio calculation processing part stores (Eq. 8) as the average fault ratio prediction model 2023 for the circuit pattern (M3) of the upper wiring layer.

As described above, the average fault ratio calculation processing part generates an average fault ratio prediction model 2023 for each layer, completes the average fault ratio prediction model database 202, and stores the database 202 into the storage 200.

In the above processing, the average fault ratio calculation processing part performs the CAA simulation using the conventional Critical Area Analysis with respect to a chip as a whole, the SRAM part or the Logic part as the target of the simulation to obtain the average fault ratio $\theta$ of a chip as a whole, the average fault ratio $\theta_{SRAM}$ of the SRAM part or the average fault ratio $\theta_{Logic}$ of the Logic part. This CAA simulation or the Critical Area Analysis is a well-known method, and thus its procedure will be described here simply. FIG. 33 is a diagram for explaining a procedure for obtaining an average fault ratio by the Critical Area Analysis.

The Critical Area Analysis comprises a step (FIG. 33(*a*)) in which layout data of a circuit pattern are inputted to generate a curve 41 of failure probability against defect diameter, and a step (FIG. 33(*b*)) in which an inspection result of a manufacturing line is inputted to generate a defect occurrence rate curve (the normalized defect size distribution function curve) 42 or a defect particle diameter distribution curve is generated by using a formula. Then, by obtaining the hatched part 43 from a product sum of these two curves 41 and 42 (FIG. 33(*c*)), an average fault ratio $\theta$ is obtained.

The curve 41 of FIG. 33(*a*) shows that the larger the diameter of defect is, the higher the probability of occurrence of failure (short circuit or breaking) in a circuit pattern. Further, it is known that defects occurring in a manufacturing line are expressed by $F(x)=(n-1) \cdot xo^{n-1} \cdot x^{-n}$, where $F(x)$ is occurrence rate, x is a diameter of a defect, and n is a defect size distribution parameter. The curve 42 in FIG. 33(*b*) is depicted according to this formula. The product of the curve 41 and the curve 42 is obtained, and then the integral of the product from the minimum diameter xo to infinity leads to the area of the hatched part 43 of FIG. 33(*c*). By this, it is possible to obtain a electric fault ratio $\theta A$ of the layer c of the product A, for example.

After the processing of Step 141, the average fault ratio calculation processing part calculates areas of the SRAM part and the Logic part by using the chip size of the product A, the occupancies of the SRAM part and the Logic part, which have been previously acquired by the product characteristic acquisition processing part. Then, the acquired $\theta_{SRAM}$ and $\theta_{Logic}$ of the SRAM part and the Logic part and the respective areas are substituted into the average fault ratio prediction model 2023 for the circuit pattern 2022 associated with the layer c 2021 stored in the memory 28, to calculate the average fault ratio $\theta_A$ of the layer c of the product A. The calculated average fault ratio $\theta_A$ is stored into the memory 28. Also, as for the product B, the average fault ratio $\theta_B$ of the layer c is calculated similarly by using the product characteristics of the product B, which have been previously acquired by the product characteristic acquisition processing part. The calculated average fault ratio $\theta_B$ is stored into the memory 28 (Step 142). The average fault ratio prediction model database can be used for all the average fault ratio calculation processing, and thus it is sufficient to perform the average fault ratio prediction model generation processing once before the average fault ratio calculation processing.

Figure 34:
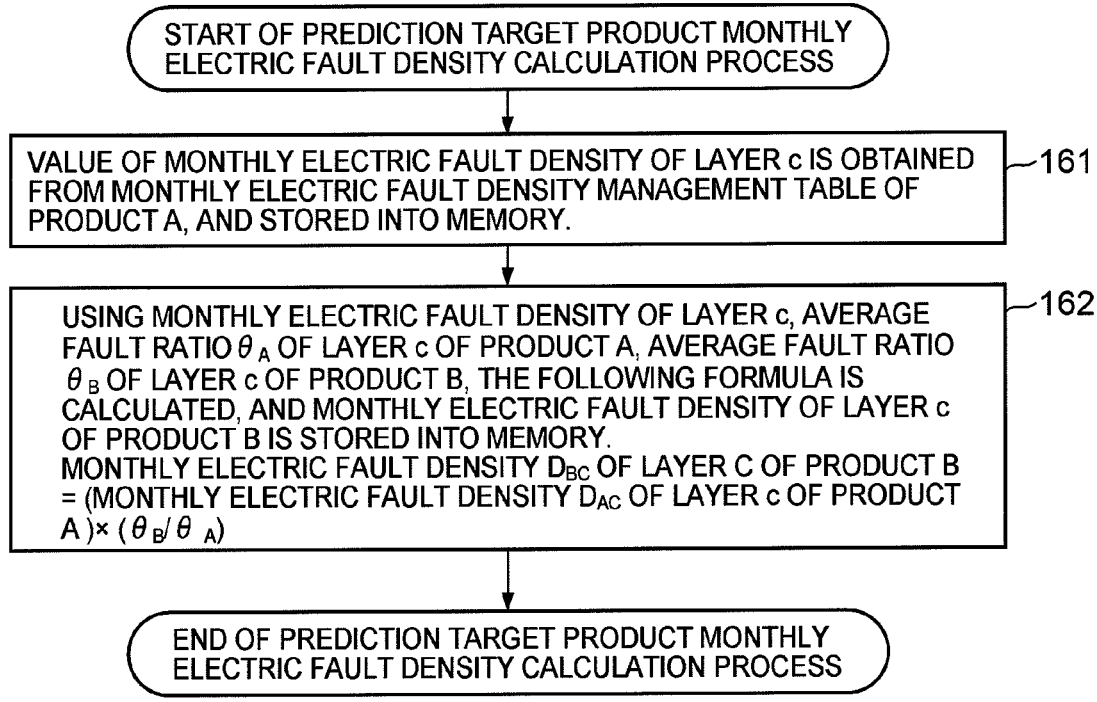
FIG. 34 is a flowchart showing monthly electric fault density calculation processing of prediction target product.

Next, prediction target product monthly electric fault density calculation processing (Step 18 of FIG. 19) performed by the prediction target product monthly electric fault density calculation processing part will be described. The electric fault density of the product can be obtained by Doc×θo from the total defect density Doc of the layer c and the average fault ratio θo of the layer c. FIG. 34 shows flow of the prediction target product monthly electric fault density calculation processing of the present embodiment.

The prediction target product monthly electric fault density calculation processing part acquires the monthly electric fault density $D_{AC}$ of the layer c of the product A from the monthly electric fault density management table 204 for the product A, and stores the acquired monthly electric fault density $D_{AC}$ into the memory 28 (Step 161).

Here, the electric fault density of the product B is calculated as follows.

$$\text{Electric fault density of the layer } c \text{ of the product } B = D_{OC} * \theta_B$$
$$= D_{OC} * \theta_A * \theta_B / \theta_A$$

where $D_{OC}$ is the total defect density of the defects occurring in the layer c. Here, $D_{OC}*\theta_A$ corresponds to the monthly electric fault density $D_{AC}$ of the product A. Thus, the electric fault density of the product B can be expressed as follows.

$$\text{Electric fault density of the layer } c \text{ of the product } B =$$
$$\text{electric fault density of the layer } c \text{ of the product } A * \theta_B / \theta_A =$$
$$D_{AC} * \theta_B / \theta_A$$

The prediction target product monthly electric fault density calculation processing part calculates the monthly electric fault density $D_{BC}$ of the layer c of the product B from the ratio (θB/θA) of the average fault ratio θB of the layer c of the product B to the average fault ratio θA of the layer c of the product A and the monthly electric fault density $D_{AC}$ of the layer c of the product A. The average fault ratios have been calculated by the average fault ratio calculation part. Here, $D_{BC}=D_{AC}*(\theta_B/\theta_A)$ is calculated, and the result is stored into the memory 28 (Step 162).

Figure 35:
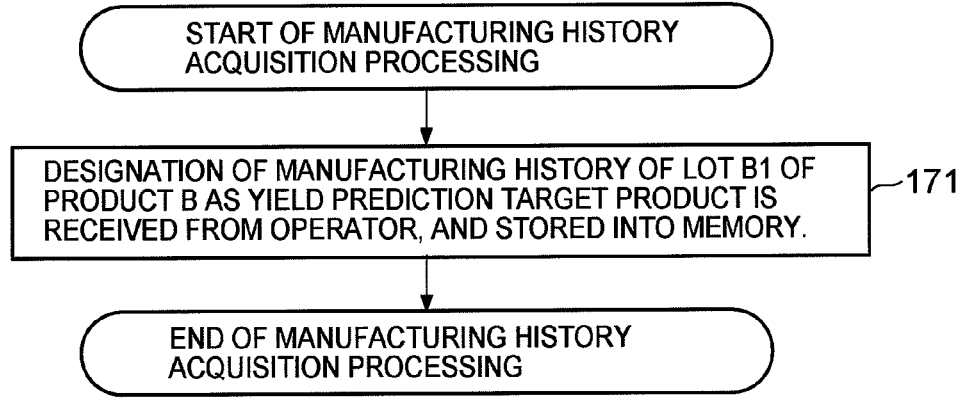
FIG. 35 is a flowchart showing manufacturing history acquisition processing.

Next, manufacturing history acquisition processing (Step 19 of FIG. 19) performed by the manufacturing history acquisition processing part will be described. FIG. 35 shows a flow of the manufacturing history acquisition processing of the present embodiment.

As described above, the manufacturing history acquisition processing part receives designation of the manufacturing history of the lot B1 of the yield prediction target product B from the operator through the data input part 26, and stores the manufacturing history instructed into the memory 28 (Step 171). The manufacturing history acquisition processing can be performed at any time before yield calculation processing.

Figures 36, 37:
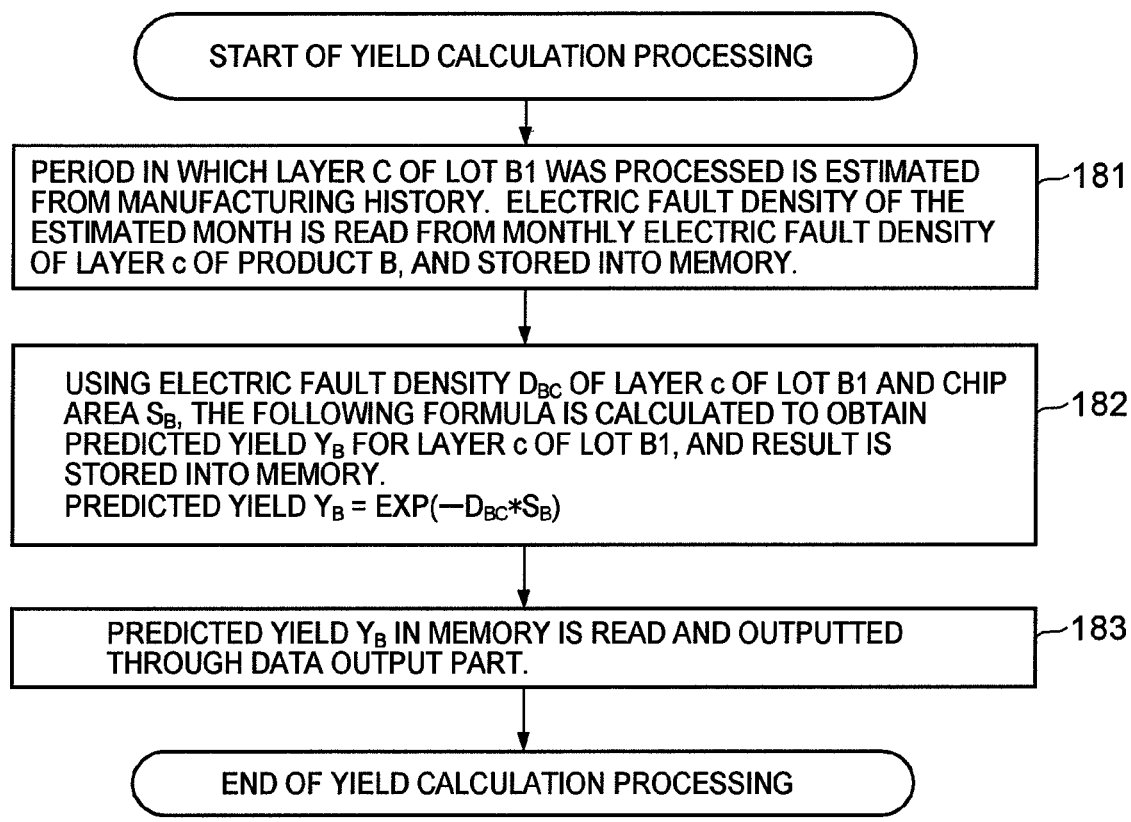
FIG. 36 is a flowchart showing yield calculation processing.
FIG. 37 is a diagram explaining a procedure for obtaining a electric fault density.

Next, the yield calculation processing (Step 20 of FIG. 19) performed by the yield calculation processing part will be described. FIG. 36 shows a flow of the yield calculation processing of the present embodiment.

The yield calculation processing part identifies the date at which the processing of the layer c of the lot B1 of the product B was performed, on the basis of the month of the launch of transistor formation layer or the month of the launch of wiring layer and the expected month of electrical inspection, which have been acquired by the manufacturing history acquisition calculation processing part. Then, the electric fault density $D_{BC}$ of the identified month is read from the monthly fatal density of the layer c of the product B, which has been calculated by the prediction target product monthly electric fault density calculation processing part. Then, the electric fault density $D_{BC}$ is stored into the memory 28 (Step 181).

Here, an example of method of estimating the date at which the processing of the layer as the yield prediction target was performed will be described.

In the case of a manufacturing process in which the yield prediction target layer belongs to transistor formation layers, estimation and determination are made assuming that the processing of the transistor formation layers is finished in two months from the month of the launch of the transistor formation layers. FIG. 37 is a diagram explaining a procedure in which the date of performing the processing is estimated on the basis of the inputted launch month and the electric fault density is acquired from the table storing the monthly electric fault density of each layer of the product B, in the case of the process whose yield prediction target layer belongs to the transistor formation layers. Here, for example, the method of estimation of the processing date of each layer will be described, assuming that the layers a through c belong to the transistor formation layers. Referring to the figure, in the case where the month of the launch of the transistor formation layers is January, it is possible to judge that the three layers a, b and c have been processed between January and February since the processing of the transistor formation layers requires two months. Assuming that the processing of each layer is performed at a constant speed, it is possible to estimate that the layer a was processed in January, the layer b from January to February, and the layer c in February. According to the example of the figure, the electric fault density $D_{Ba}$ of the layer a is 0.091, the monthly electric fault density DBb of the layer b is 0.027 as an approximation using the average of the monthly electric fault densities of January and February, and the electric fault density $D_{Bc}$ of the layer c is 0.054.

Further, in the case where the yield prediction target layer belongs to wiring layers, the processing date of the yield prediction target layer is estimated assuming that the layer is processed at a constant speed between the month of the launch of the wiring layers and the expected month for electrical inspection. FIG. 38 is a diagram for explaining a procedure in which the date of performing the processing is estimated on the basis of the inputted launch month and the electric fault density is acquired from the table storing the monthly electric fault density of each layer of the product B, in the case of the process whose yield prediction target layer belongs to the wiring layers. Here, for example, it is assumed that the layers d to f belong to the wiring layers. As shown in the figure, in the case where the month of the launch of the wiring layers is May and the expected month for electrical inspection is July, the layers d to f are processed for three months from May to July. Since the manufacturing is assumed to be performed at a constant speed, it is estimated that the layer d is processed in May, the layer e in June, and the layer f in July respectively. To acquire the electric fault density of the layer f for example, the electric fault density of July is required. Since the fatal defect density of July, i.e., the expected month for electrical inspection, has not been acquired yet, the electric fault density of June is substituted for the electric fault density of July.

After Step 181, the yield calculation processing part calculates Eq. 9 by using the electric fault density $D_{BC}$ stored in the memory 28 in Step 181 and the chip area $S_B$, and calculates the predicted yield $Y_{BC}$ for the layer c of the lot B1 by the following formula.

$$Y_{BC}=\exp(-D_{BC}*S_B) \quad \text{(Eq. 9)}$$

The calculated predicted yield is expressed in percent terms and the result is stored into the memory 28 (Step 182). Here, the chip area $S_B$ is calculated by using the chip size in the product characteristic management table 201.

For example, assuming that the layer c of the lot B1 has been processed in February as shown in FIG. 37, the monthly electric fault density $D_{BC}$ is 0.054. Further, according to the product characteristic management table 201 of FIG. 28, the chip size of the product B is 1.6 cm. Thus, in this example, the predicted yield $Y_{BC}$ of the layer c of the lot B1 of the product B is calculated as $Y_{Bc}=\exp(-0.054*1.6*1.6)=087$. The predicted yield $Y_{Bc}$ is obtained as 87%, and this result is stored into the memory 28.

Thereafter, the yield calculation processing part reads the yield prediction result $Y_{Bc}$ stored in the memory 28 and outputs the result through the data output part 27 (Step 183).

Hereinabove, the case of predicting the yield of one layer c of a predetermined lot B1 of the product B has been described as an example. To predict the yield Y of the product B as a whole, the yield of each layer is calculated by a similar procedure, to obtain the product of the calculated yields as yield Y.

In the above embodiment, the yield of each layer is obtained and the yield Y of the product B as a whole is obtained by multiplying the respective yields of the layers. However, a procedure for obtaining the yield Y of the product B as a whole is not limited to this. The yield Y of the product B as a whole can be calculated by obtaining respective electric fault densities $D_{Ba}, D_{Bb}, D_{Bc}, D_{Bd}, \ldots$ for the circuit layers a, b, c, d, ... constituting the product B by a procedure similar to the above embodiment and then by calculating $Y=\exp(-(D_{Ba}+D_{Bb}+D_{Bc}+D_{Bd}+ \ldots)\times S_B)$. Here, $S_B$ is the chip area of the product B.

FIG. 39 is a diagram for explaining a procedure in which the processing month is estimated and the electric fault density is obtained from the table storing the monthly electric fault density of each layer of the product B, to calculate the yield. For example, the case of a lot for which the month of launch of the transistor formation layers is January, the month of launch of the wiring layers is May, and the expected month for electrical inspection is July is considered. Then, assuming that the transistor formation layers (the layers a-c) have been processed in two months, the respective electric fault densities of the layers are calculated as $D_{Ba}=0.091$, $D_{Bb}=(0.026+0.028)/2=0.027$, and $D_{Bc}=0.054$. The electric fault densities of the wiring layers (the layers d-f) are $D_{Bd}=0.034$, $D_{Be}=0.008$, and $D_{Bf}=0.009$. The total sum of the electric fault densities of the layers a-f is 0.223, and the yield Y of the lot is calculated as 56% in this case.

Figure 40:
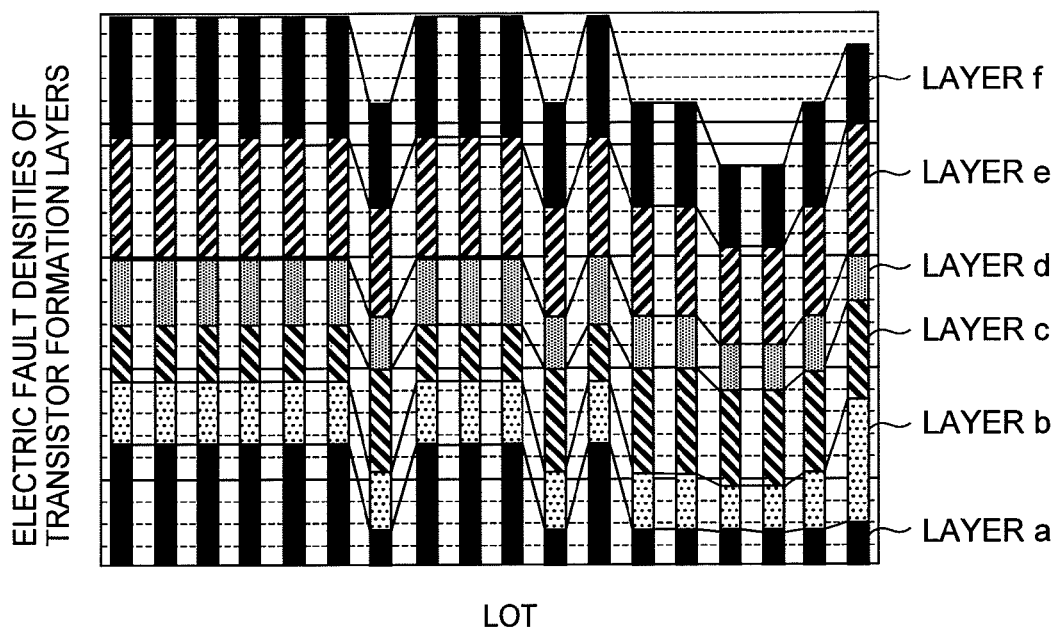
FIG. 40 is a diagram showing an example of prediction of transition of electric fault density in a transistor formation layer.

FIG. 40 shows transition of the electric fault density of each transistor formation layer, which has been calculated with respect to 18 lots. It is found that the electric fault density of the layer a fluctuates largely. As a result, it is possible to judge that differences in the electric fault densities of the transistor formation layers are caused mainly by the layer a.

Figure 41:
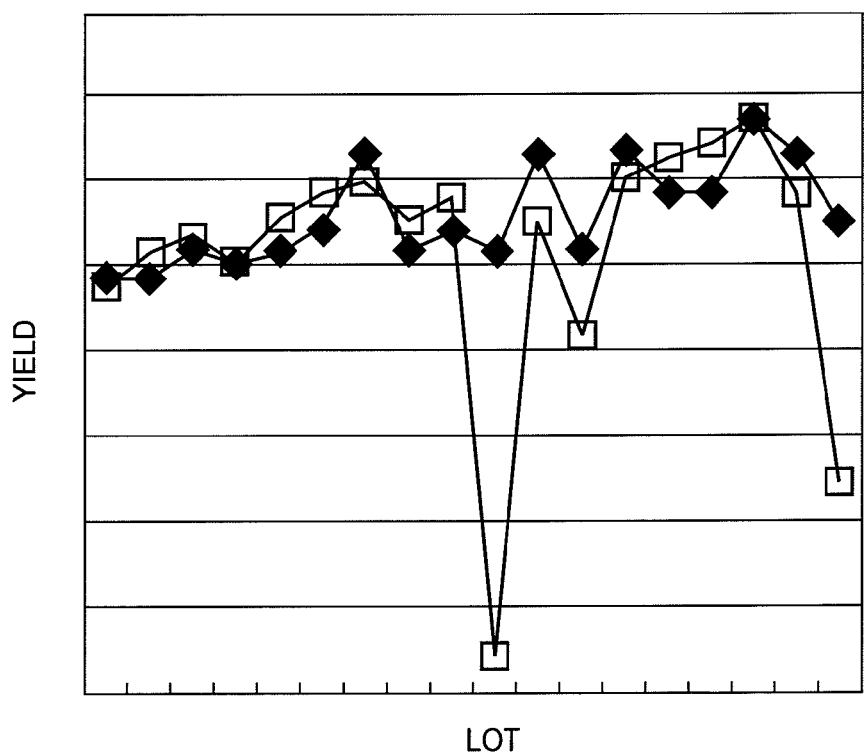
FIG. 41 is a diagram showing an example of comparison between a predicted value of the final yield and a measured value.

FIG. 41 shows a result of comparison between the predicted values of the final yield, which have been predicted by applying the yield prediction system of the present embodiment to 18 lots, and the actually-measurement values. The line connecting black quadrangles shows the predicted values, and the line connecting white quadrangles shows the actually-measured values. As shown in the figure, although there are two lots whose yields fall largely owing not only to functional failures caused by defects but also to characteristic defects, the other lots show favorable prediction results. Thus, the present embodiment can predict the yield that reflects fluctuation in defects occurring in each layer, by calculating the electric fault density of each layer.

According to the present embodiment, it is possible, giving consideration to un-connected gate modules, to calculate an average fault ratio, by employing an average fault ratio prediction model that uses product characteristics. As a result, in particular, accuracy of yield prediction of transistor formation layers is improved. When the yield can be predicted accurately in the stage where transistor formation layers have been made, it is possible to select products that can be processed using such master wafers. For example, a product whose transistor formation layers have good yield can be used for producing a difficult product whose wiring layers have a high average fault ratio. Or, a product whose transistor formation layers have poor yield can be used for producing easily-producible product whose wiring layers have a low average fault ratio.

As described above, the yield prediction system of the present embodiment can predict the average fault ratio of the yield prediction target product B conveniently from the product characteristics, and can predict the yield $Y_B$ of the product B, which reflects transition of the electric fault density of each layer in the manufacturing line. In other words, in the course of manufacturing a wide variety of electronic devices that are manufactured in small volumes by utilizing existing circuits on a substrate of, for example, a gate array product, it is possible to predict the yield of a prescribed layer accurately. Owing to accurate yield prediction in the course of manufacturing, the manufacturer can easily make a manufacturing plan for the subsequent period. For example, in the case where a resultant yield is lower than a desired yield, an additional lot can be launched without awaiting completion of the product. In the reverse case, another product different in wiring layers may be manufactured. Thus, a required quantity of product can be manufactured to meet the delivery deadline by launching an additional lot without awaiting completion of product, preventing delivery delay. Further, manufacturing of surplus products can be prevented by manufacturing another product having different wiring layers, and the product B can be manufactured at low cost. Thus, according to the present embodiment, it is possible to improve the accuracy of yield prediction made in the course of manufacturing of a product, and thus the probability of attaining the desired yield of the target product is raised. As the probability of attaining the desired yield becomes higher, the possibility of wasteful manufacturing is lowered, and the possibility of manufacturing the product at low cost becomes higher.

Further, according to the present embodiment, an average fault ratio can be calculated conveniently by using product characteristics as described above. As a result, calculation time can be shortened.

As described above, according to the present embodiment, it is possible to make dynamic yield prediction that reflects the number of dust particles occurring in the manufacturing process of circuit layers, and the yield prediction accuracy is improved.

Although the above embodiment considers failure probability owing to defects only on the basis of diameters of the defects, the embodiment is not limited to this. For example, an average fault ratio prediction model may be derived based on a failure probability calculation result that considers up to remedy allowing for potential of a circuit pattern.

The invention claimed is:

1. An electronic device yield prediction system for predicting manufacturing yield of a first electronic device, comprising:

a first database, which stores product characteristics, including at least a chip size, that are factors characterizing each kind of electronic device of a plurality of electronic device including a first and second electronic device, a second database, which stores an average fault ratio prediction model that derives an average fault ratio indicating a proportion of defects causing a failure of an electronic device from defects occurring at a time of manufacturing the electronic device corresponding to a circuit pattern of each layer of the electronic device, as an explanatory factor of one or more of the product characteristics, a third database, which stores a yield impact of one defect occurring on a layer corresponding to each layer of a second electronic device whose stacked layer structure of each circuit layer is identical to that of the first electronic device, whose manufacturing process of the stacked layer structure is similar to that of the first electronic device, but whose wiring pattern is different from that of the first electronic device;

an electric fault density calculation unit, which calculates, using an average defect count measured at a predetermined unit of time with respect to each layer of the second electronic device and corresponding yield impact read out from the third database, an electric fault density, which is a number of electric faults per unit area, indicating a ratio of defects causing the second device to fail among defects occurring in manufacturing which is calculated at each unit of time, and which stores the electric fault density in a fourth database;

an average fault ratio calculation unit, which reads out an average fault ratio prediction model corresponding to a circuit pattern of each layer of the first and the second electronic devices from the second database, reads out product characteristics of the first and the second electronic device from the first database, and calculates an average fault ratio of each layer of the first and the second electronic devices;

a prediction target product electric fault density calculation unit which reads out the electric fault density of each layer of the second electronic device, calculated by the electric fault density calculation unit per each unit of time, and stored in the fourth database, calculates electric fault density of each layer of the first electronic device per each unit of time by multiplying a proportion of the average fault ratio of each layer of the first electronic device calculated by the average fault ratio calculation unit and the average fault ratio of each layer of the second electronic device; and wherein a yield calculation unit, which estimates, on a basis of a manufacturing history of a prediction target lot of the first electronic device, a period in which a corresponding layer of the prediction target lot is processed, selects an electric fault density of the corresponding layer of the first electronic device among the electronic fault densities of each layer of the first electronic device calculated at the predetermined unit of time and stored by the prediction target product electric fault density calculation unit, and calculates a prediction yield of product for a corresponding layer of the prediction target lot of the first electronic device by using the selected electric fault density and a chip size read out from the first database.

2. The electronic device yield prediction system of claim 1, wherein:
the product characteristics include at least one of an occupancy of functional blocks, and occupancy of a wiring area.

3. The electronic device yield prediction system of claim 1, wherein:
the first electronic device has a plurality of circuit layers;
the second electronic device has layers corresponding respectively to the plurality of circuit layers of the first electronic device;
the electric fault density calculation unit, the average fault ratio calculation unit, the prediction target product electric fault density calculation unit, and the yield calculation unit, calculate respectively the electric fault density of the second electronic device, a first average fault ratio, a second average fault ratio, and an electric fault density of the first electronic device, for each of the circuit layers of the first electronic device and the circuit layers of the second electronic device corresponding respectively to the circuit layers of the first electronic device; and wherein
based on the manufacturing history of a prediction target lot of the first electronic device, the yield calculation unit estimates a period when a corresponding layer of the prediction target lot is processed, selects among electric fault densities of each layer of the first electronic device calculated at a predetermined unit of time and recorded in the prediction target product electric fault density calculation unit, electric fault density of a corresponding layer of the first electronic device at the period, calculates a prediction of yield of a product of a corresponding layer of the prediction target lot of the first electronic device by using the selected electric fault density and a chip size read out from the first database, and calculates the yield of the first electronic device as a whole by multiplying the prediction of the yield of the corresponding layers of the first electronic device.

4. An electronic device yield prediction method for predicting a manufacturing yield of a first electronic device, the method comprising:
an electric fault density calculation step, in which an electric fault density, which is a number of defects causing an electronic device to fail per unit area among defects occurring in manufacturing, is calculated, at each unit of time, by using an average defect count actually measured during the period at the predetermined unit of time, and a yield impact indicating a degree of impact that is given to a yield of a second electronic device by one defect occurring in a corresponding layer of the second electronic device, with respect to a corresponding layer of the second electronic device whose stacked layer structure of each circuit layer is identical to the first electronic device, whose manufacturing process of the stacked layer structure is similar to the first electronic device, but whose wiring patterns are different from the first electronic device;
an average fault ratio calculation step, in which average fault ratios for each layer of the first and the second electronic devices are calculated by reading out an average fault ratio prediction model that derives an average fault ratio indicating a proportion of defects causing a failure of an electronic device from defects occurring at a time of manufacturing the electronic device corresponding to a circuit pattern of each layer of the first and the second electronic devices, as an explanatory factor of one or more of the product characteristics, and inputting product characteristics of the first and the second electronic devices;

a prediction target product electric fault density calculation step, in which the electric fault density of each layer of the first electronic device per each unit of time is calculated by multiplying the electric fault density of each layer of the second electronic device per each unit of time, which has been calculated in the electric fault density calculation step, by a ratio of a first average fault ratio to a second average fault ratio, with each layer of the first and second average fault ratio being calculated in the average fault ratio calculation step per each unit of time; and a yield calculation step, in which based on manufacturing history of a prediction target lot of the first electronic device, a period in which a corresponding layer of the prediction target lot is processed is estimated, an electric fault density of each layer of the first electronic device of the period is selected among electric fault densities of each layer of the first electronic device calculated for the predetermined unit of time and recorded in the prediction target product electric fault density calculation step, a prediction yield of product of each layer of the prediction target lot of the first electronic device is calculated by using the selected electric fault density and a chip size, and the yield calculation step calculates a yield of the prediction target lot of the first electronic device as a whole by multiplying a prediction yield of the corresponding layers of the first electronic device;

wherein at least one of the electric fault density calculation step, the average fault ratio calculation step, the prediction target product electric fault density calculation step, and the yield calculation step, is carried out by a processor device.

5. An electronic device yield prediction system for predicting manufacturing yield of a targeted electronic device which is to be manufactured, comprising:

a first database, which stores product characteristics, including at least a chip size, that are factors characterizing each kind of electronic device of a plurality of electronic devices including a targeted and a past electronic device, a second database, which stores an average fault ratio prediction model that derives an average fault ratio indicating a proportion of defects causing a failure of an electronic device from defects occurring at a time of manufacturing the electronic device corresponding to a circuit pattern of each layer of the electronic device, as an explanatory factor of one or more of the product characteristics, a third database, which stores a yield impact of one defect occurring on a layer corresponding to each layer of a past electronic device which had been manufactured in the past, whose stacked layer structure of each circuit layer is identical to that of the targeted electronic device, whose manufacturing process of the stacked layer structure is similar to that of the targeted electronic device, but whose wiring pattern is different from that of the targeted electronic device;

an electric fault density calculation unit, which calculates, using an average defect count measured at a predetermined unit of time with respect to each layer of the past electronic device and corresponding yield impact read out from the third database, an electric fault density, which is a number of electric faults per unit area, indicating a ratio of defects causing the past device to fail among defects occurring in manufacturing which is calculated at each unit of time, and which stores the electric fault density in a fourth database;

an average fault ratio calculation unit, which reads out an average fault ratio prediction model corresponding to a circuit pattern of each layer of the targeted and the past electronic devices from the second database, reads out product characteristics of the past electronic device from the first database, and calculates an average fault ratio of each layer of the targeted and the past electronic devices;

a prediction target product electric fault density calculation unit, which reads out an electric fault density of each layer of the past electronic device, calculated by the electric fault density calculation unit per each unit of time, and stored in the fourth database, and calculates electric fault density of each layer of the targeted electronic device per each unit of time by multiplying a proportion of the average fault ratio of each layer of the targeted electronic device calculated by the average fault ratio calculation unit and the average fault ratio of each layer of the past electronic device; and wherein a yield calculation unit, which estimates, on a basis of a manufacturing history of a prediction target lot of the targeted electronic device, a period in which a corresponding layer of the prediction target lot is processed, selects an electric fault density of the corresponding layer of the targeted electronic device among the electric fault densities of each layer of the targeted electronic device calculated at the predetermined unit of time and stored by the prediction target product electric fault density calculation unit, and calculates a prediction yield of product for a corresponding layer of the prediction target lot of the targeted electronic device by using the selected electric fault density and a chip size read out from the first database.

* * * * *